(12) United States Patent
Waldner et al.

(10) Patent No.: US 9,663,303 B2
(45) Date of Patent: May 30, 2017

(54) PORTABLE CONVEYOR SYSTEM WITH DRIVE-OVER UNLOADING RAMP AND A LONGITUDINAL CONVEYOR FEEDING A BUCKET ELEVATOR

(71) Applicant: Norstar Industries Ltd., Morris (CA)

(72) Inventors: Raymond Waldner, Morris (CA); Cameron Cornelsen, Morris (CA); Randy Martens, Morris (CA)

(73) Assignee: NORSTAR INDUSTRIES LTD., Morris, Manitoba (CA)

( * ) Notice: Subject to any disclaimer, the term of this patent is extended or adjusted under 35 U.S.C. 154(b) by 0 days.

(21) Appl. No.: 15/029,331

(22) PCT Filed: Oct. 16, 2014

(86) PCT No.: PCT/CA2014/050998
§ 371 (c)(1),
(2) Date: Apr. 14, 2016

(87) PCT Pub. No.: WO2015/054790
PCT Pub. Date: Apr. 23, 2015

(65) Prior Publication Data
US 2016/0221761 A1   Aug. 4, 2016

Related U.S. Application Data

(60) Provisional application No. 61/891,945, filed on Oct. 17, 2013, provisional application No. 61/943,543, filed on Feb. 24, 2014.

(51) Int. Cl.
*B65G 21/14*   (2006.01)
*B65G 41/00*   (2006.01)
(Continued)

(52) U.S. Cl.
CPC ......... *B65G 41/002* (2013.01); *B65G 17/126* (2013.01); *B65G 41/008* (2013.01);
(Continued)

(58) Field of Classification Search
CPC ...... B65G 67/00; B65G 67/02; B65G 41/008; B65G 21/12; B65G 21/14
(Continued)

(56) References Cited

U.S. PATENT DOCUMENTS

| | | | |
|---|---|---|---|
| 3,170,560 A | 2/1965 | Obmascher | |
| 3,378,152 A * | 4/1968 | Warner | B65G 47/18 198/582 |

(Continued)

FOREIGN PATENT DOCUMENTS

| | | |
|---|---|---|
| EP | 1371543 | 12/2003 |
| RU | 2214355 | 10/2003 |

*Primary Examiner* — James R Bidwell
(74) *Attorney, Agent, or Firm* — Kyle R. Satterthwaite; Ryan W. Dupuis; Ade & Company Inc.

(57) ABSTRACT

A portable conveyor system for receiving particulate material from a transport vehicle and conveying the particulate material to an elevated location. A main conveyor features a bucket elevator carried on a wheeled transportable frame and movable between an operational position standing upright from the transportable frame and a storage position laid down along the transportable frame. A feeder conveyor connected to the transportable frame is operable to convey material from into an inlet of the bucket elevator that is situated adjacent a lower end the elevator's upright operational position. A drive-over assembly enables loading of the feeder conveyor from a bottom unload transport vehicle. The feeder conveyor and the drive-over assembly may be carried on a movable framework for movement of the feeder conveyor between a stowed position on the transportable frame, and a use position extending laterally outward to
(Continued)

position the drive-over assembly beside the transportable frame.

20 Claims, 23 Drawing Sheets

(51) Int. Cl.
*B65G 17/12* (2006.01)
*B65G 47/16* (2006.01)
*B65G 47/34* (2006.01)
*B65G 47/58* (2006.01)

(52) U.S. Cl.
CPC ............. *B65G 47/16* (2013.01); *B65G 47/34* (2013.01); *B65G 47/58* (2013.01)

(58) Field of Classification Search
USPC ........ 198/312, 313, 314, 315; 414/537, 374, 414/376, 574, 573, 389, 528
See application file for complete search history.

(56) References Cited

U.S. PATENT DOCUMENTS

| 3,606,050 | A | | 9/1971 | Silver | |
|---|---|---|---|---|---|
| 5,297,914 | A | | 3/1994 | Ash | |
| 5,964,566 | A | * | 10/1999 | Stewart | B65G 67/24 198/302 |
| 7,063,497 | B2 | * | 6/2006 | Mast | B65G 67/24 198/302 |
| 7,090,066 | B2 | * | 8/2006 | Kirsch | B65G 67/24 198/302 |
| 7,424,943 | B2 | * | 9/2008 | Gausman | B65G 67/24 198/311 |
| 8,196,729 | B2 | | 6/2012 | Gausman | |
| 8,684,161 | B2 | * | 4/2014 | Gausman | B65G 47/18 198/311 |
| 8,960,412 | B1 | * | 2/2015 | Maxwell | B65G 47/72 198/531 |
| 2005/0220579 | A1 | * | 10/2005 | Ash | B61D 47/00 414/339 |

* cited by examiner

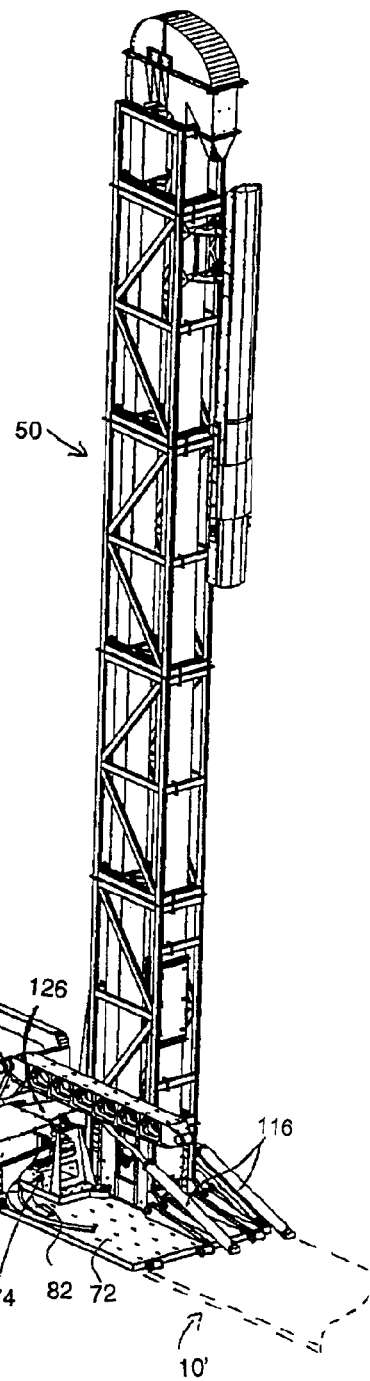
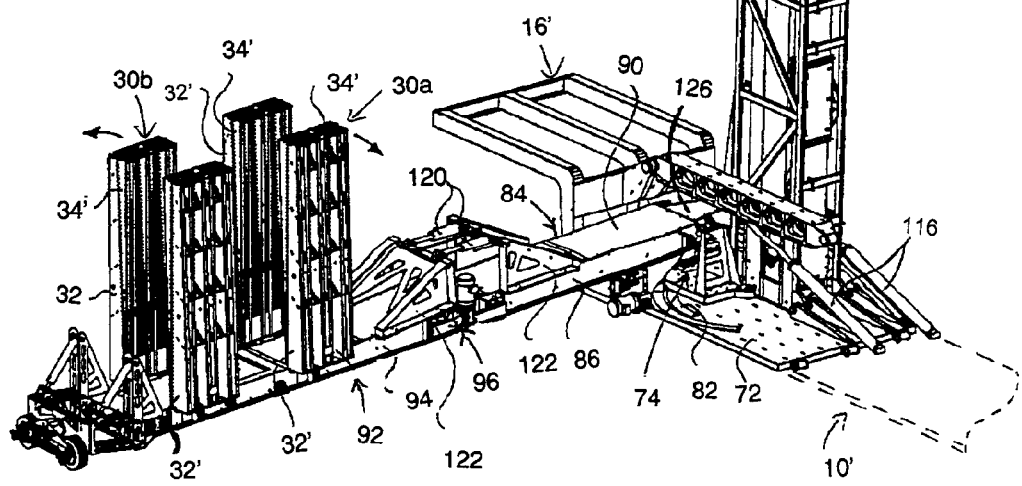
FIGURE 11

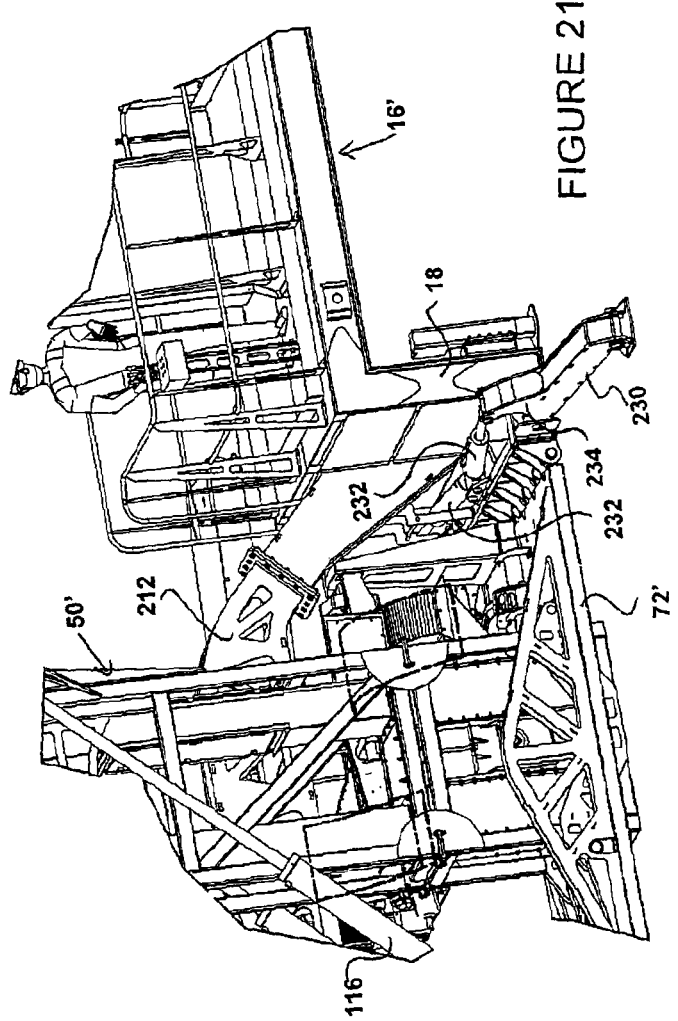

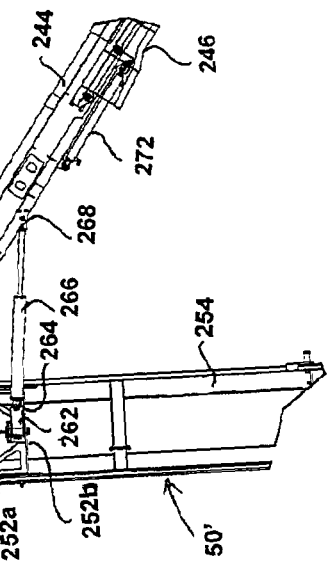
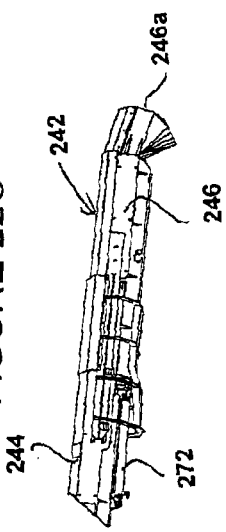
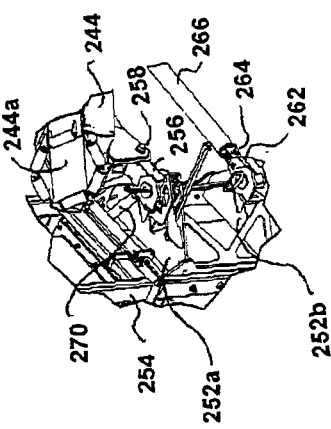
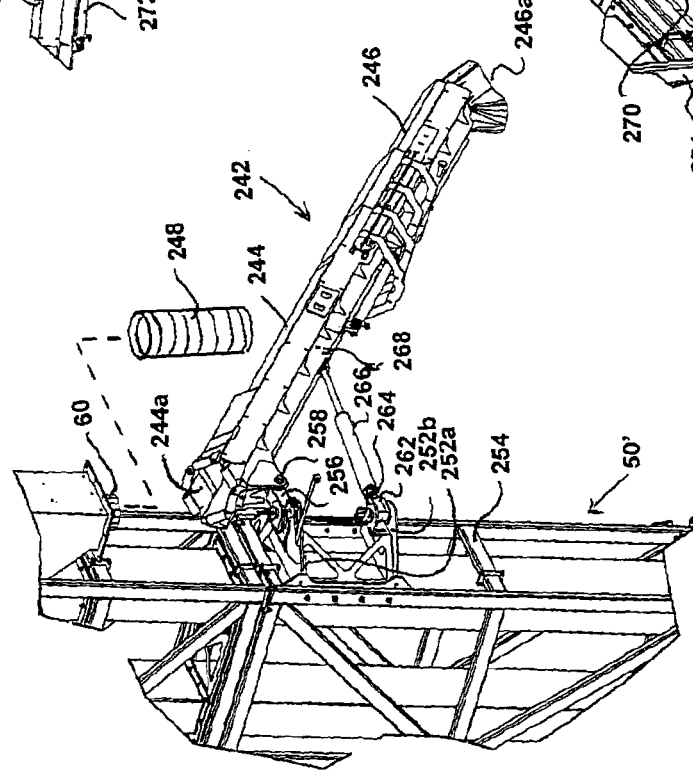
FIGURE 22B
FIGURE 22C
FIGURE 22D
FIGURE 22A

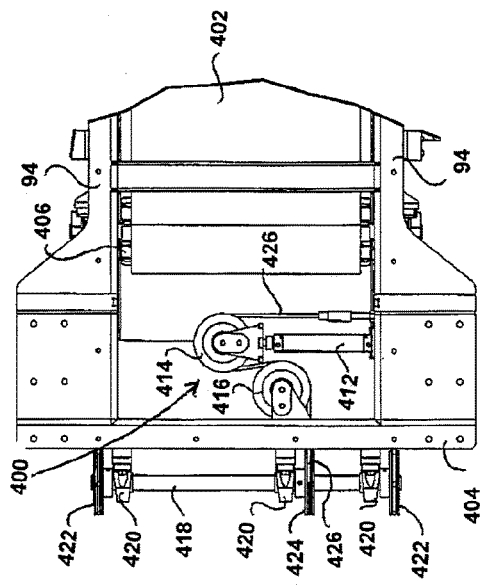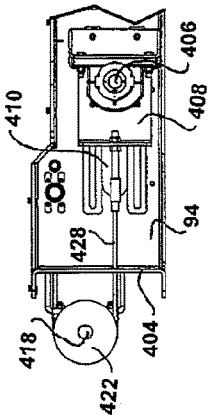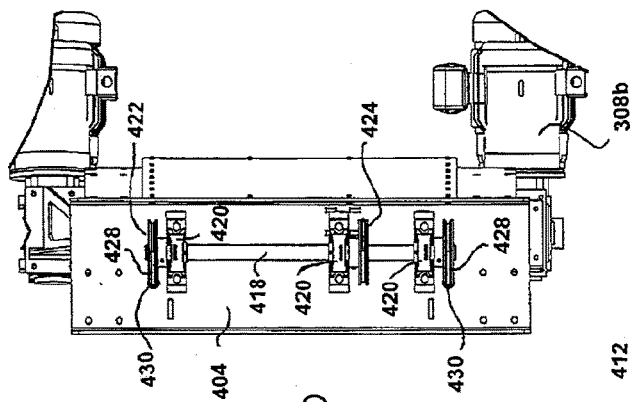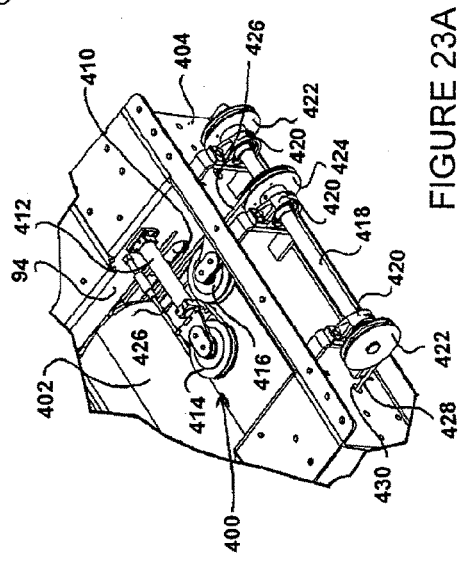

PORTABLE CONVEYOR SYSTEM WITH DRIVE-OVER UNLOADING RAMP AND A LONGITUDINAL CONVEYOR FEEDING A BUCKET ELEVATOR

This application is the national stage of PCT/CA2014/050998, filed Oct. 16, 2014, and claims benefit under 35 U.S.C. 119(e) of U.S. Provisional Application Ser. No. 61/891,945, filed Oct. 17, 2013 and U.S. Provisional Application Ser. No. 61/943,543, filed Feb. 24, 2014.

FIELD OF THE INVENTION

The present invention relates generally to portable conveyor solutions for loading of particulate material from a transport vehicle into the elevated inlet of a storage bin or the like, and more particularly to a trailer-mounted solution employing a drive-over ramp assembly from which vehicle-transported particulate is dumped onto a first conveyor for delivery to a bucket elevator that feeds the storage bin.

BACKGROUND OF THE INVENTION

A known challenge in various industries requiring transport of particulate material is to find cost-effective and time and space efficient solutions for conveying particulate material to elevated locations, for example to an inlet opening at the top of an upright storage bin in which the particulate material is to be stored for subsequent use.

One example of such situations can be found in the oil and gas industry, where the use of hydraulic fracturing is becoming more commonplace. The process is used to improve production from a hydrocarbon formation by pumping fluid and proppant material downhole in order to use high fluid pressures to fracture the formation and hold the fractures open with the granular proppant material. U.S. Patent Application Publication 2011/0123303 describes known challenges in filling horizontal or vertically oriented proppant storage tanks using conventional pneumatic conveyance systems found on some tractor-trailer proppant transport vehicles. The reference draws particular attention to the problem of long vehicle unloading times and limited space to allow unloading of multiple vehicles simultaneously. This reference discloses storage containers that have their own dedicated auger, screw or bucket conveyors running vertically up the tank wall in order to fill the tank from an upper inlet. However, one potential drawback is the notable cost of incorporating a dedicated conveyor at every proppant storage tank.

Other applications requiring unloading and conveyance of particulate or granular material include the process of filling grain bins in the agricultural industry. Conventional solutions in this field include the use of a short transfer auger to laterally convey grain out from under a hopper-bottomed grain trailer and into a larger main auger that slopes obliquely up to the top of the grain bin. However, accurate relative positioning between a large transport vehicle and the transfer auger inlet can be physically challenging and/or time consuming, especially if available space around the bin is limited by the presence of trees, additional bins, or other structures.

U.S. Pat. No. 7,090,066 assigned to Bourgault Industries Ltd. discloses a portable grain unloading and conveying system that employs ramps and augers on a trailer frame in order to provide a mobile solution where the transport vehicle can simply be unloaded in a drive-over manner using the ramps. The underside outlet of the transport vehicle empties out into a pair of horizontal auger conveyors disposed between two side beams of the trailer frame through a grate-style platform mounted atop the trailer frame. The horizontal augers empty into the lower end of an upwardly sloped auger at the end of the trailer opposite the trailer hitch.

Another drive-over trailer-mounted conveyor solution for use in the agriculture and aggregate industries disclosed in U.S. Pat. Nos. 7,845,482, 7,424,943, 7,607,529, 8,011,490 and 8,430,225 assigned to Superior Industries LLC.

U.S. Pat. No. 2,867,336 teaches a mobile concrete batching system in which a receiving hopper for bulk cement accepts bulk cement from a hopper-bottom truck, but this receiving hopper is buried in the ground in order to achieve the resulting drive-over unloading station. This increases the complexity and time involved to setup the mobile plant for use.

Chinese Utility Model 2478984 teaches a wheel conveyor apparatus for filling of grain bins, but lacks an onboard solution for feeding of the conveyor from a hopper bottom vehicle in a drive-over manner.

PCT Application Publication 2011/0707975 teaches a mobile asphalt mixing plant including multiple on-board conveyors, but again lacks a built in drive-over unloading Solution for trucked-in source materials.

European Patent 0230883 teaches a mobile bucket elevator for handling of bulk materials, but also lacks a drive-over unloading solution.

Applicant has developed a portable conveyor solution employing unique and advantageous feature combinations previously unseen in the prior art.

SUMMARY OF THE INVENTION

According to one aspect of the invention, there is provided a portable conveyor system for receiving particulate material from a transport vehicle and conveying said particulate material to an elevated location, the portable conveyor system comprising:

a transportable frame comprising ground wheels for rolling support of the transportable frame on a ground surface during transport of said transportable frame;

a main conveyor comprising a bucket elevator carried on the transportable frame and movable between an operational position standing upright in relation to the transportable frame and a storage position laid down from the upright position to lie more along the transportable frame than upright therefrom;

a feeder conveyor connected to the transportable frame and operable to convey material from an input region of the feeder conveyor to an output end of the feeder conveyor for feeding said material into an inlet of the bucket elevator that is situated adjacent a lower end of the bucket elevator in the operational position;

a drive-over assembly comprising a bridging portion spanning transversely across the feeder conveyor at the inlet region thereof; and a flow-through area in the bridging portion having at least one opening therein to allow passage of particulate material through the flow through area of the bridging platform to the inlet region of the feeder conveyor.

The feeder conveyor and the drive-over assembly may be carried on a conveyor framework which is movably connected to the transportable frame for movement of said feeder conveyor between a stowed position and a use position extending laterally outward from the transportable frame to position placing the drive-over assembly beside the transportable frame.

According to a second aspect of the invention, there is provided a portable conveyor system for receiving particulate material from a transport vehicle and conveying said particulate material to an elevated location, the portable conveyor system comprising:

a transportable frame comprising ground wheels for rolling support of the transportable frame on a ground surface during transport of said transportable frame;

a main conveyor carried on the transportable frame and movable into and out of an operational position in which an outlet of the main conveyor is at a greater elevation relative to an inlet of the main conveyor than in a storage position in which the main conveyor is less upright than in said operational position;

a feeder conveyor operable to convey material from an input region of the feeder conveyor to an output end of the feeder conveyor for feeding said material into the inlet of the main conveyor; and a conveyor framework movably connected to the transportable frame for movement of said feeder conveyor between a stowed position and a use position extending laterally outward from the transportable frame; and a drive-over assembly carried on the conveyor framework and comprising a bridging portion spanning transversely across the feeder conveyor at the inlet region thereof; and a flow-through area in the bridging portion having at least one opening therein to allow passage of particulate material through the flow through area of the bridging platform to the inlet region of the feeder conveyor.

Preferably the conveyor framework is arranged to reside between opposing sides of the transportable frame in the stowed position.

Preferably the feeder conveyor comprises a first conveyor section spanning out from under the bridging portion of the drive-over assembly and a second longitudinal conveyor section fed by first longitudinal conveyor section and leading therefrom toward the inlet of the bucket elevator, and the first and second feeder conveyor sections are respectively carried on first and second sections of the conveyor framework that are pivotally joined by a pivotal connection that allows relative pivoting between said first and second sections of the conveyor framework about an axis lying transverse to said feeder conveyor.

Preferably there is provided at least one support wheel mounted to a wheeled portion of the conveyor framework for rolling support of the conveyor framework into and out of the use position.

Preferably there is provided a conveyor ramp moveable into an access position extending from the transportable frame down to the ground surface at the same side of the transport frame from which the conveyor framework extends in the use position to enable rolling movement of the wheeled portion of the conveyor framework off of and back onto the transportable frame via said conveyor ramp during movement of the conveyor framework into and out of the use position.

Preferably there is provided a conveyor repositioning mechanism operably connected to the conveyor framework to drive movement thereof into and out of the use position.

Preferably the conveyor framework is pivotally connected to the transportable frame for swinging movement of the conveyor framework about an upright pivot axis into and out of the use position, and the conveyor repositioning mechanism comprises at least one drive wheel mounted to the conveyor framework at a distance from the upright pivot axis.

Preferably the conveyor repositioning mechanism comprises a hydraulic motor operably connected to said drive wheel for driven rotation thereof by said hydraulic motor.

Preferably said drive wheel is mounted to the conveyor framework at an end thereof that is situated distal to the upright pivot axis and past the drive-over assembly and the inlet region of the feeder conveyor.

Preferably there is provided at least one feeder conveyor stand that reaches upward from the transportable frame, wherein the conveyor framework is arranged to reside atop said feeder conveyor stand in the stowed position.

Preferably there is provided at least one feeder conveyor lock down mechanism on the transportable frame that is arranged to lock the feeder conveyor in the stowed position.

Preferably the feeder conveyor frame comprises at least one longitudinal beam having a flange projecting laterally therefrom, and the feeder conveyor lock down mechanism is arranged to engage over said flange.

Preferably the at least one longitudinal beam comprises two longitudinal beams, and the feed conveyor lock down mechanism comprises two hooked members that lie in a cross-wise direction to the two longitudinal beams in the stowed position of the feeder convey with hooked outer ends of the hooked members opening toward one another in the cross-wise direction, and a lock actuator that is operable in a locking direction to draw the hooked outer ends of the two hooked members toward one another in the cross-wise direction to hook over the flanges of the two longitudinal beams, and is operable in an opposing release direction to force the hooked outer ends of the two hooked members apart in the cross-wise direction to withdraw said hooked outer ends from the flanges of the two longitudinal beams.

Preferably there is provided a control system featuring at least one tilt sensor installed on the transportable frame and operable to detect level and unlevel conditions thereof, and at least one main conveyor actuator connected between the main conveyor and the transportable frame and operable to raise the main conveyor into the operational position, wherein the control system is configured to prevent raising of the main conveyor by the at least one conveyor raising actuator in the absence of a detected level condition of the transportable frame by the at least one tilt sensor.

Preferably the control system is configured to prevent deployment of the feeder conveyor by the at least one feeder conveyor actuator in the absence of a detected level condition of the transportable frame by the at least one tilt sensor.

Preferably the control system is coupled to a drive unit of at least one of the main and feeder conveyors, and is configured to automatically terminate operation of the drive unit in response to a detected unlevel condition of the transportable frame by the at least one tilt sensor during operation of said drive unit.

Preferably there are respective conveyor repositioning mechanisms for the main and feeder conveyors, by which the main conveyor is movable between the storage and operational positions and the feeder conveyor is movable between the stowed and use positions; and the control system comprises sensors operable to detect a positional status of each of the main and feeder conveyors, and is configured to prevent movement of one of the main and feed conveyors by the respective conveyor repositioning mechanism in the absence of a particular detected positional status of the other one of the main and feed conveyors.

The control system may be configured to prevent deployment of the feeder conveyor from the stowed position to the use position prior to deployment of the main conveyor from the storage position to the operational position.

The control system may be configured to prevent return of the main conveyor from the raised position to the storage position prior to return of the feeder conveyor to the stowed position from the use position.

In one embodiment, the transportable frame has opposing first and second ends spaced apart in a longitudinal direction thereof and the feeder conveyor and the main conveyor are connected to the transportable frame at positions offset from one another in a lateral direction lying cross-wise to the longitudinal direction.

In such instance, preferably the main conveyor resides entirely to one side of the feeder conveyor in said lateral direction.

Preferably the main conveyor is pivotally mounted to the transportable frame for pivotal movement between the operational and storage positions.

Preferably there is at least one actuator coupled between the transportable frame and the main conveyor and operable to move the bucket elevator from the storage position to the operational position.

Preferably there is provided a movable discharge member connected or connectable to the outlet end of the main conveyor and at least one discharge member actuator connected to the movable discharge member and operable to adjust a position of a discharge end of the discharge member relative to the outlet end of the main conveyor.

Preferably the at least one discharge member actuator comprises a pair of positioning actuators operable to move the discharge member relative to the main conveyor about two different axes.

Preferably the at least one discharge member actuator comprises a length adjustment actuator operable to extend and collapse the discharge member in a longitudinal direction between the discharge end thereof and an opposing inlet end thereof that is connected, or connectable, to the outlet end of the main conveyor.

Preferably there is a flexible conduit that is connected or connectable between the discharge member and the outlet end of the main conveyor in order to accommodate relative movement therebetween.

Preferably the at least one discharge member actuator is arranged to enable movement of the discharge member between a collapsed position lying along the main conveyor and an extended position radiating outwardly away therefrom.

Preferably the main conveyor is arranged to lie at an inclined angle relative to the transportable frame in the storage position, with a higher end of the main conveyor spaced above the transportable frame to accommodate the collapsed position of the movable discharge member between the main conveyor and the transportable frame.

Preferably there is at least one main conveyor stand that reaches upward from the transportable frame, wherein the main conveyor is arranged to reside atop said main conveyor stand in the storage position.

Preferably the at least one main conveyor stand comprises a plurality of main conveyor stands of different height in order to support the main conveyor at the inclined angle in the storage position.

Preferably the feeder conveyor comprises a belt conveyor.

Preferably the belt conveyor comprises:

a conveyor frame comprising a pair of conveyor frame rails;

a belt positioned between said conveyor frame rails and entrained about a set of rollers that lie cross-wise to the pair of conveyor frame rails and include a displaceable end roller at one end of the belt, the displaceable end roller having opposing ends thereof supported by roller support brackets that are slidably disposed on the pair of conveyor frame rails for movement of the end roller back and forth along said pair of conveyor frame rails; and a belt tensioning mechanism comprising:

a displaceable pulley connected to the conveyor frame by a linear actuator that is mounted to one of the conveyor frame rails in a space defined between the pair of conveyor frame rails and between the end of the belt entrained about the displaceable end roller and a cross-member of the conveyor frame that connects the conveyor frame rails together at a location beyond said end of the belt;

a tensioning cable having a first end that is attached to the conveyor frame and a second end that is connected to at least one of the roller support brackets from a direction opposing that in which the belt reaches from the displaceable end roller toward an opposing end of the belt;

whereby actuation of the linear actuator in one direction tensions the belt by pulling the roller support brackets and the end roller carried thereby away from the opposing end of the belt.

Preferably the belt tensioning mechanism further comprises a static pulley mounted to the conveyor frame at a fixed position relative thereto in the space defined between the conveyor frame rails, the tensioning cable being serpentined about said displaceable and static pulleys and entrained about a rotatable shaft that lies parallel to the displaceable end roller, the rotatable shaft having additional lengths of cable entrained thereabout, free ends of which are attached to the roller support brackets to form a connection of the tensioning cable to the roller support brackets via the rotatable shaft and the additional lengths of cable, whereby actuation of the linear actuator in one direction lengthens a serpentine path of the tensioning cable around the static and displaceable pulleys in order to unwind more of the tensioning cable from the rotatable shaft and thereby drive rotation of the shaft in a direction pulling on the roller support brackets via the additional lengths of cable.

Preferably the tensioning cable is entrained about a center pulley mounted on the rotatable shaft, and each additional length of cable is defined by a separate connection cable entrained about one of two outer pulleys that are mounted to the rotatable shaft on opposite sides of the center pulley.

Preferably the static and displaceable pulleys are disposed between the rotatable shaft and the end of the belt that is entrained about the displaceable end roller.

Preferably the rotatable shaft is mounted outside of the space defined between the cross-member and the end of the belt that is entrained about the displaceable end roller.

According to a third aspect of the invention, there is provided a tensionable belt conveyor comprising:

a conveyor frame comprising a pair of conveyor frame rails;

a belt positioned between said conveyor frame rails and entrained about a set of rollers that lie cross-wise to the pair of conveyor frame rails and include a displaceable end roller at one end of the belt, the displaceable end roller having opposing ends thereof supported by roller support brackets that are slidably disposed on the pair of conveyor frame rails for movement of the end roller back and forth along said pair of conveyor frame rails; and a belt tensioning mechanism comprising:

a displaceable pulley connected to the conveyor frame by a linear actuator that is mounted to one of the conveyor frame rails in a space defined between the pair of conveyor frame rails and between the end of the belt entrained about the displaceable end roller and a crossmember of the conveyor frame that connects the conveyor frame rails together at a location beyond said end of the belt;

a tensioning cable having a first end that is attached to the conveyor frame and a second end that is connected to at least one of the roller support brackets from a direction opposing that in which the belt reaches from the displaceable end roller toward an opposing end of the belt;

whereby actuation of the linear actuator in one direction tensions the belt by pulling the roller support brackets and the end roller carried thereby away from the opposing end of the belt.

According to a fourth aspect of the invention, there is provided portable conveyor system for receiving particulate material from a transport vehicle and conveying said particulate material to an elevated location, the portable conveyor system comprising:

a transportable frame comprising ground wheels for rolling support of the transportable frame on a ground surface during transport of said transportable frame;

a main conveyor carried on the transportable frame and a feeder conveyor carried on a conveyor framework that is movably connected to the transportable frame, the feeder conveyor being operable to convey material from an input region of the feeder conveyor to an output end of the feeder conveyor for feeding of said material into the inlet of the main conveyor, the main conveyor and the feeder conveyor each being movable between a respective storage position and a respective operational position, the respective operational position of the main conveyor placing an outlet of the main conveyor at a greater elevation relative to an inlet of the main conveyor than in the respective storage position of the main conveyor in which the main conveyor is less upright than in said respective operational position of the main conveyor, and the operational position of the feeder conveyor placing the feeder conveyor in an orientation extending laterally outward from the transportable frame;

a respective conveyor repositioning mechanism for each of the main conveyor and the feeder conveyor, by which the main conveyor and the feeder conveyor are each movable between the respective storage and operational positions; and a control system comprising conveyor position sensors operable to detect a positional status of each of the main and feeder conveyors, the control system being configured to prevent movement one of the main and feed conveyors between the respective storage and operational positions thereof in the absence of a particular detected positional status of the other one of the main and feed conveyors.

Preferably the control system is configured to prevent deployment of one of the main or feeder conveyors from the respective storage position thereof prior to deployment of the other one of the main or feeder conveyor into to the respective operational position thereof.

Preferably control system is configured to prevent return of one of the main and feeder conveyors from the respective operational position thereof prior to return of the other one of the main and feeder conveyors to the respective storage position thereof.

Preferably there are provided drive-over ramps mounted to the conveyor framework of the feeder conveyor on opposing sides thereof, and movable into and out of deployed positions extending outward from the opposing sides of the conveyor framework in a direction transverse to the feeder conveyor; wherein the control system is configured to prevent deployment of the drive-over ramps until the feeder conveyor has been deployed out of the respective storage position thereof.

There may be provided ramp position sensors for detecting a positional status of the drive-over ramps, and the control system is configured to prevent return of the feeder conveyor to the respective storage position thereof until the drive-over ramps are retracted out of the deployed positions.

Preferably there is provided a movable discharge member connected or connectable to the outlet end of the main conveyor and at least one discharge member actuator connected to the movable discharge member and operable to move the discharge member between a collapsed position lying along the main conveyor and an extended position radiating outwardly away therefrom, wherein the control system is configured to prevent deployment of the discharge member into the extended position until the main conveyor has been deployed out of the respective storage position thereof.

Preferably there is provided a discharge member sensor for detecting a positional status of the discharge member, and the controller is configured to prevent return of the main conveyor to the respective storage position thereof until the discharge member is returned to the collapsed position.

According to a fifth aspect of the invention, there is provided a portable conveyor system for receiving particulate material from a transport vehicle and conveying said particulate material to an elevated location, the portable conveyor system comprising:

a transportable frame comprising ground wheels for rolling support of the transportable frame on a ground surface during transport of said transportable frame;

a main conveyor carried on the transportable frame and movable between a storage position and a operational position, the operational position placing an outlet of the main conveyor at a greater elevation relative to an inlet of the main conveyor than in the storage position in which the main conveyor is less upright than in said operational position;

a conveyor repositioning mechanism by which the main conveyor is movable between the storage and operational positions; and a control system comprising at least one tilt sensor installed on the transportable frame and operable to detect level and unlevel conditions thereof, and configured to prevent movement of the main conveyor between the respective storage and operational positions thereof in the absence of a detected level condition of the transportable frame by the at least one tilt sensor.

According to a sixth aspect of the invention, there is provided a portable conveyor system for receiving particulate material from a transport vehicle and conveying said particulate material to an elevated location, the portable conveyor system comprising:

a transportable frame comprising ground wheels for rolling support of the transportable frame on a ground surface during transport of said transportable frame;

a main conveyor carried on the transportable frame and a feeder conveyor carried on a conveyor framework that is movably connected to the transportable frame, the feeder conveyor being operable to convey material from an input region of the feeder conveyor to an output end of the feeder conveyor for feeding of said material into the inlet of the main conveyor, the main conveyor and the feeder conveyor each being movable between a respective storage position and a respective operational position, the respective operational position of the main conveyor placing an outlet of the main conveyor at a greater elevation relative to an inlet of the main conveyor than in the respective storage position of the main conveyor in which the main conveyor is less upright than in said respective operational position of the main conveyor, and the operational position of the feeder conveyor placing the feeder conveyor in an orientation extending laterally outward from the transportable frame;

a respective conveyor repositioning mechanism for each of the main conveyor and the feeder conveyor, by which the main conveyor and the feeder conveyor are each movable between the respective storage and operational positions; and a control system comprising at least one tilt sensor installed on the transportable frame and operable to detect level and unlevel conditions thereof and is configured to prevent movement of at least one of the main and feed conveyors between the respective storage and operational positions thereof in the absence of a detected level condition of the transportable frame by the at least one tilt sensor.

According to a seventh aspect of the invention, there is provided a portable conveyor system for conveying particulate material to an elevated location, the portable conveyor system comprising:

a transportable frame comprising ground wheels for rolling support of the transportable frame on a ground surface during transport of said transportable frame;

a main conveyor carried on the transportable frame and movable between a storage position and an operational position in which the main conveyor stands more upright than in the storage position in order to place an outlet of the main conveyor at a greater elevation relative to an inlet of the main conveyor than in the storage position;

a control system connected to a drive unit of the main conveyor and comprising at least one tilt sensor installed on the transportable frame and operable to detect level and unlevel conditions thereof the control system being configured to automatically terminate operation of the drive unit in response to a detected unlevel condition of the transportable frame by the at least one tilt sensor during operation of said drive unit.

Preferably there is a feeder conveyor connected to the transportable frame and operable to convey material from an input region of the feeder conveyor to an output end of the feeder conveyor for feeding of said material into the inlet of the main conveyor, wherein the control system is connected to an additional drive unit of the feeder conveyor and configured to automatically terminate operation of the additional drive unit in response to the detected unlevel condition of the transportable frame during operation of said additional drive unit.

According to yet another aspect of the invention there is provided a portable conveyor system for receiving particulate material from a transport vehicle and conveying said particulate material to an elevated location, the portable conveyor system comprising:

a trailer assembly comprising a longitudinally extending frame having opposing first and second ends spaced apart in a longitudinal direction of said frame, a hitch coupler carried on the frame at the first end thereof and support wheels on the frame at a distance spaced from the first end thereof in the longitudinal direction for rolling support of the frame on a ground surface during transport of the trailer assembly;

a pair of ramp assemblies connected to the frame and each movable between a deployed position extending laterally outward from the frame on a respective side thereof in a direction transverse to the longitudinal direction, and a stowed position retracted inwardly from the deployed position relative to the frame in the transverse direction;

a bridging platform mounted to the frame at a position spanning between locations at which the ramp assemblies extend outwardly from the frame in the deployed position to form a bridge that links together the two ramp assemblies over the frame to enable driving of the transport vehicle over the frame via the ramp assemblies and the bridging platform;

a flow-through area in the bridging platform having at least one opening therein to allow passage of particulate material downwardly through the flow through area of the bridging platform;

a longitudinal conveyor carried on the frame and reaching in the longitudinal direction from an input region of the longitudinal conveyor located beneath the flow-through area of the bridging platform to a distal output end of the longitudinal conveyor; and a bucket elevator carried on the frame and movable between an upright operational position in which a longitudinal dimension of the bucket elevator between an inlet end of the bucket elevator and an opposing outlet end of the bucket elevator reaches upwardly from the frame at a location adjacent the output end of the longitudinal conveyor to place the outlet end of the bucket elevator at an elevated location spaced above the trailer assembly, and a storage position in which the longitudinal dimension of the bucket elevator lies along the longitudinal direction of the trailer with the inlet and outlet ends of the bucket elevator disposed adjacent respective ones of the first and second ends of the frame at a lesser height than the elevated location of the operational position.

The longitudinal conveyor may comprise a first longitudinal conveyor section spanning out from under the bridging platform, and a second longitudinal conveyor section fed by first longitudinal conveyor section and inclined relative thereto in order to slope upwardly moving toward the inlet end of the bucket conveyor in the longitudinal direction of the frame so as to feed an inlet opening of the bucket conveyor that is elevated above the frame with the bucket elevator in the operational position.

Preferably the hitch coupler is carried on a gooseneck structure at the first end of the frame.

BRIEF DESCRIPTION OF THE DRAWINGS

In the accompanying drawings, which illustrate exemplary embodiments of the present invention:

FIG. 11 is a perspective view of the second embodiment mobile conveyor system during a second stage of its transition from its collapsed transport state to its operational state.

FIG. 21 is a partial view of the third embodiment mobile conveyor system of FIG. 15 from a side perspective.

FIGS. 22A through 22D are various partial views of the third embodiment mobile conveyor system, illustrating an adjustable discharge chute mounted to the bucket elevator thereof.

FIGS. 23A through 23D are perspective, side, plan and end views, respectively, of a tensioning mechanism of a belt conveyor of the third embodiment mobile conveyor system.

DETAILED DESCRIPTION

Figure 1:
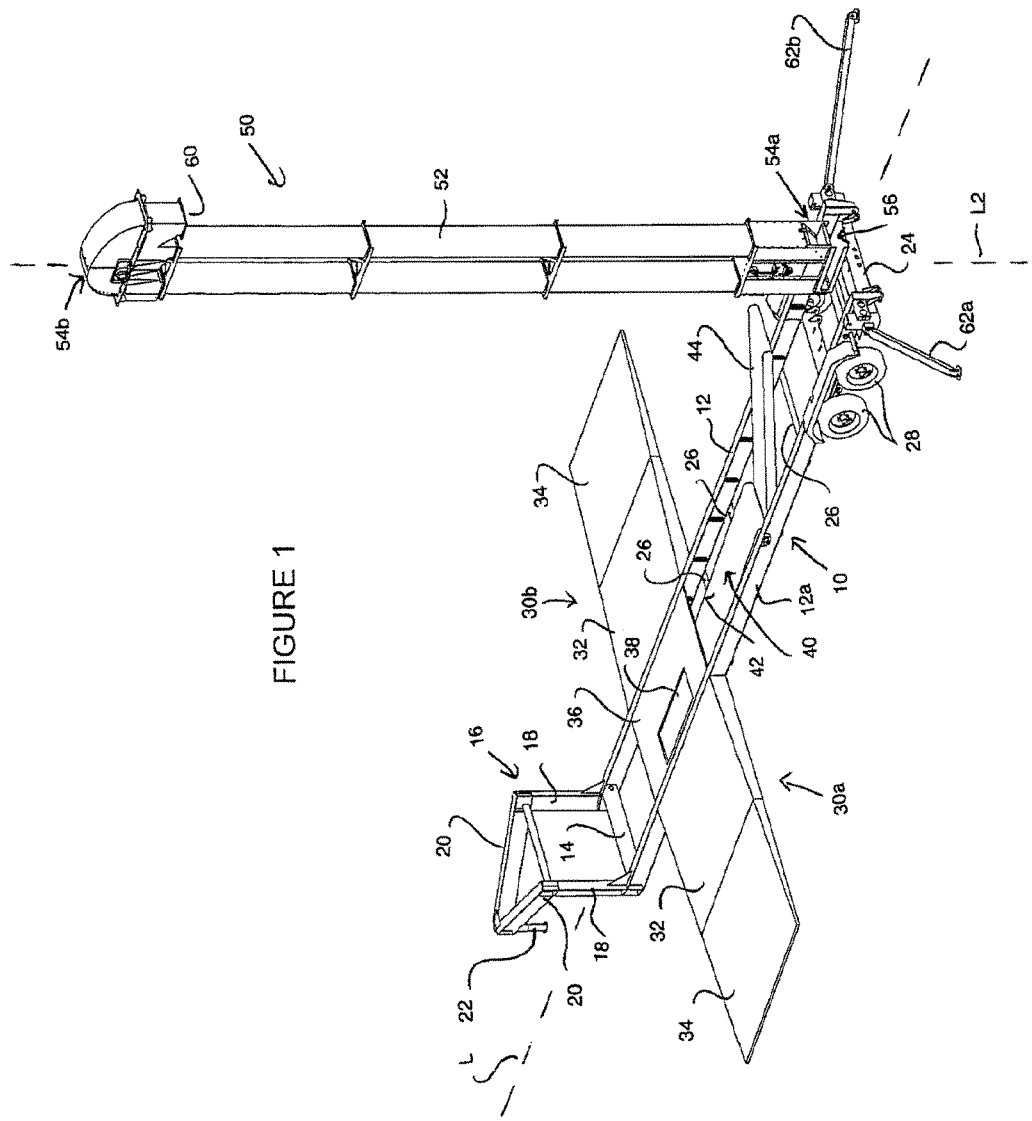
FIG. 1 is a perspective view of a first embodiment mobile conveyor system that is shown in an operational state ready for use, and that features a set of drive-over ramps from which a hopper-bottom transport vehicle can deposit its granular cargo onto a belt conveyor system that feeds into a vertically upright bucket elevator, all of which are carried on a trailer frame for transport of the system by a conventional tow vehicle.
Figure 2:
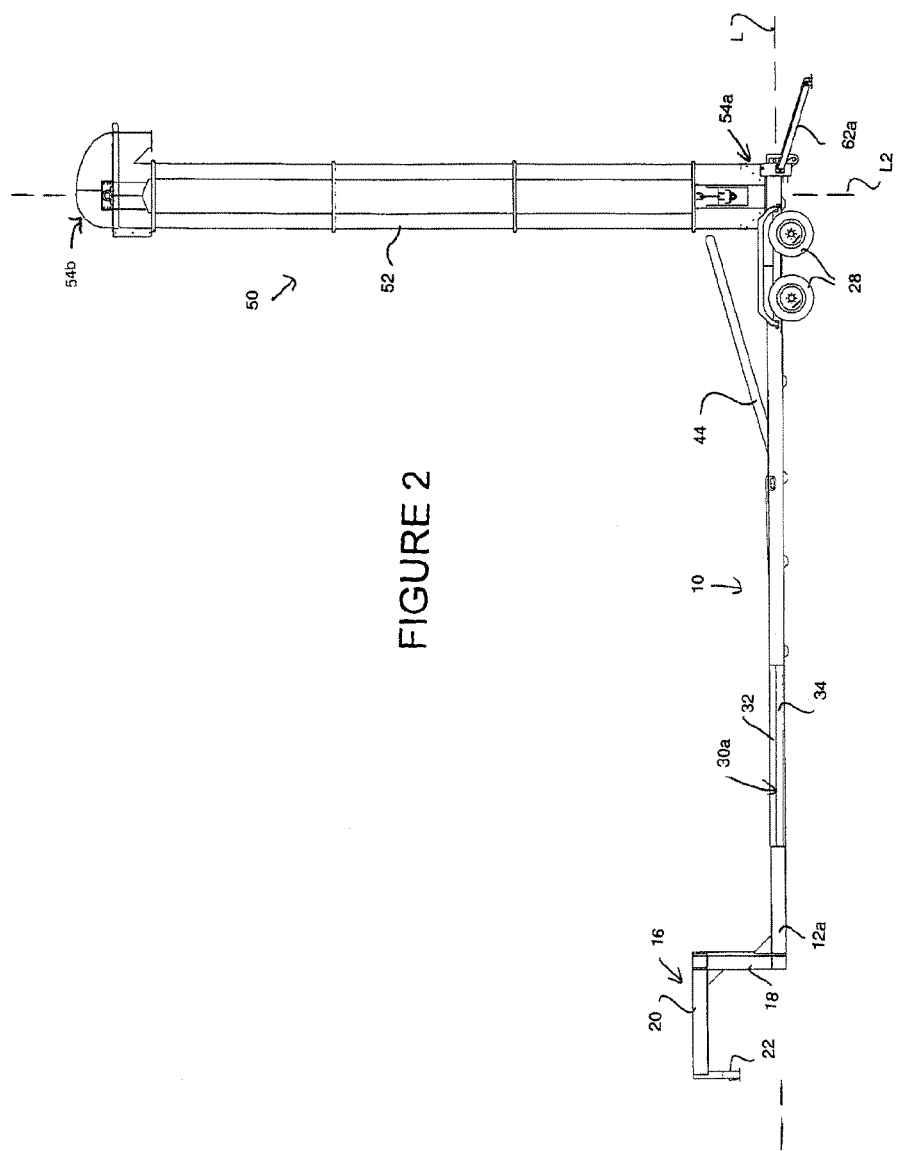
FIG. 2 is a side elevational view of the first embodiment mobile conveyor system of FIG. 1.
Figure 3:
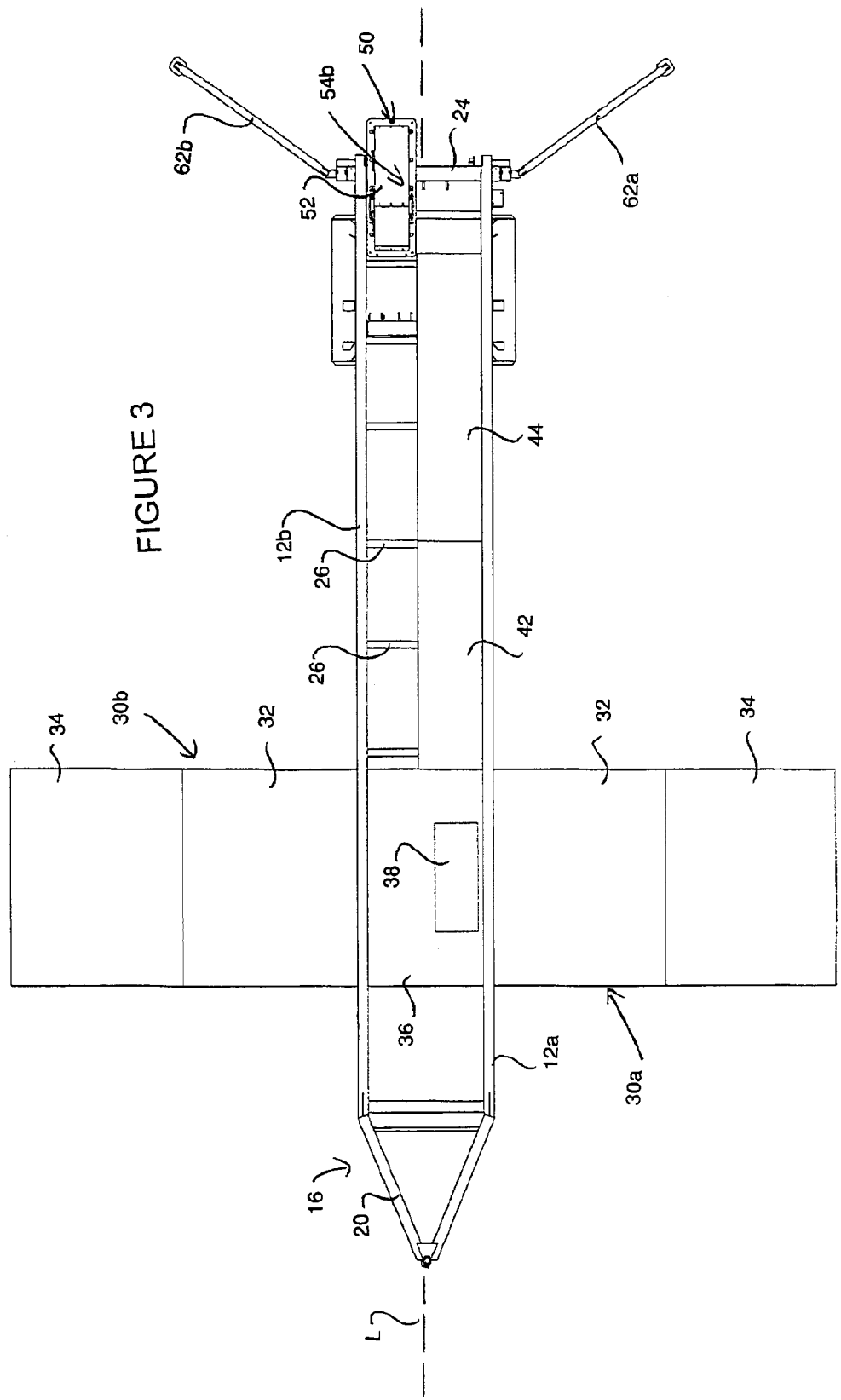
FIG. 3 is an overhead plan view of the first embodiment mobile conveyor system of FIG. 1.
Figure 4:
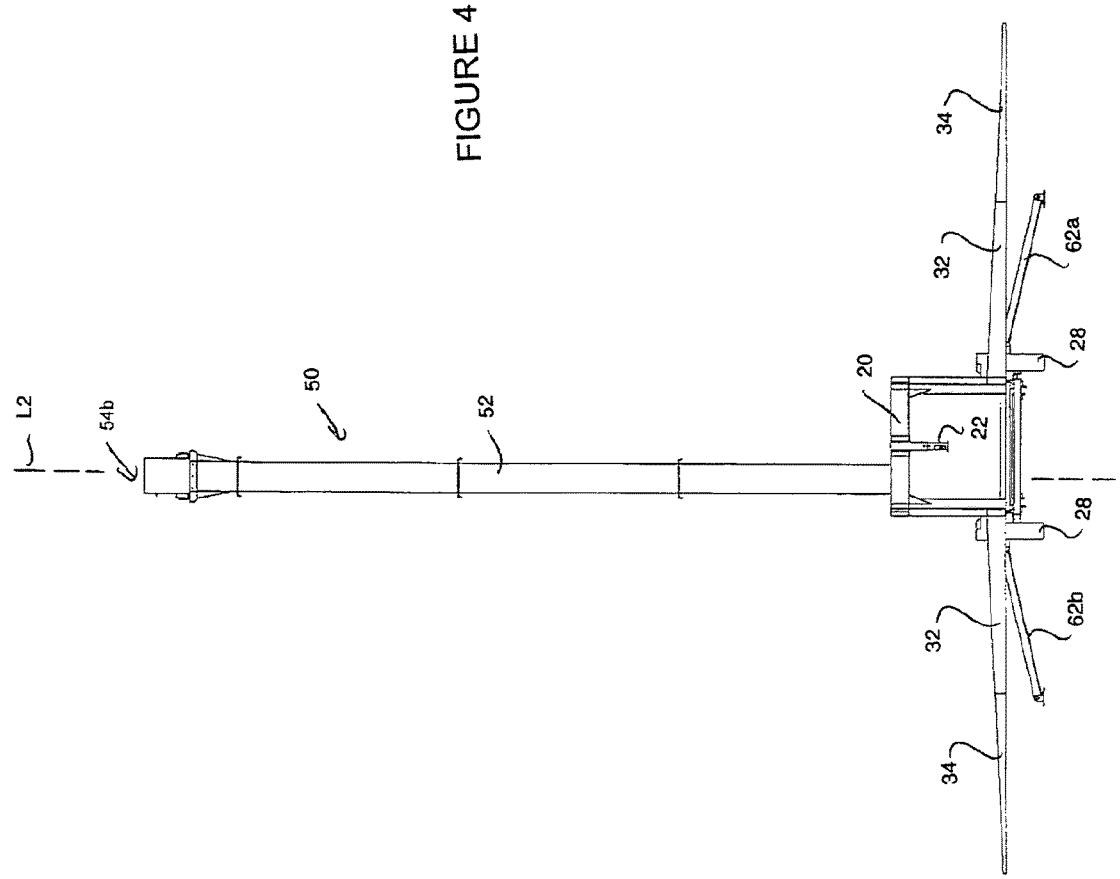
FIG. 4 is an end elevational view of the first embodiment mobile conveyor system of FIG. 1.

FIG. 1 shows a portable or mobile conveyor system according to one embodiment of the present invention. The system provides an all-in-one solution for emptying of particulate or granular material from a bottom-unload vehicle such as a hopper-bottom transport truck or trailer and for vertically conveying the material up to an elevated location using an on-board bucket conveyor, which is fed by a built in intermediate conveyor that automatically moves the material from beneath the transport vehicle to the bucket conveyor. From comparison of FIGS. 1 and 5, it can be seen that the system is convertible between an expanded ready-for-use operational state, and a collapsed ready-for-travel transport state. The conveyor system can be used to fill hydraulic fracturing proppant tanks at hydrocarbon well sites with sand or other granular proppant material from a proppant transport vehicle, to fill grain bins in the agriculture industry from a grain transport vehicle, or for similar vehicle-to-container unloading and filling of granular or particulate material in any of a number of other possible applications.

The system is a trailer mounted unit to allow convenient transport of the unit to various locations that may require a granular material filling operation. The trailer features a frame 10 including two longitudinal side beams 12a, 12b that lie parallel to one another on opposite sides of a central longitudinal axis L of the trailer. The length of the trailer frame along this axis defines a lengthwise dimension of the trailer, which notably exceeds a width dimension measured perpendicularly transverse to the longitudinal axis L.

At a first end of the trailer frame 10, a cross-beam 14 perpendicularly interconnects the two longitudinal beams 12 and a gooseneck structure 16 features a pair of uprights 18 standing vertically upward from the longitudinal beams 12, from which a pair of converging beams 20 extend forwardly from the uprights away from the remainder of the trailer in the longitudinal direction. A hitch coupler 22 is mounted to the converging beams 18 where their forward ends meet in a central vertical plane of the trailer that contains the longitudinal axis L. The trailer is thus equipped to form a gooseneck connection to a suitable towing vehicle in a conventional manner Other hitch types may alternatively be employed.

At a second end of the trailer that opposes the hitch-equipped first end thereof along the longitudinal axis L, another cross-beam 24 joins together the two longitudinal beams. A series smaller of intermediate cross-beams 26 at spaced intervals along the longitudinal axis L act to further reinforce the rectangular frame structure defined by the longitudinal beams 12 and two end beams 14. At least one pair of ground wheels 28 (for example, two pairs in the first illustrated embodiment) are rotatably supported on the frame near the second end thereof with the wheels of each pair disposed on opposite sides of the frame for rolling support of the trailer frame on the ground during towing of the trailer by a suitable tow vehicle (not shown) hooked up to the trailer via the hitch coupler 22. It will be appreciated that the trailer structure described above is of a conventional structure, and may be varied within the scope of the present invention.

Near the first end of the trailer frame 10, a first ramp assembly 30a is connected to the longitudinal beam 12a on one side of the trailer frame, and a second ramp assembly 30b is connected to the other longitudinal beam 12b on the other side of the trailer frame 10. In the illustrated first embodiment, the two ramp assemblies are identical to one another, and accordingly further description is made with only reference to one of the two ramp assemblies. A first ramp section 32 features a hinged connection to the respective longitudinal beam 12a of the trailer frame 10 in order to provide this first ramp section 32 with a pivot axis that is parallel to the trailer's longitudinal axis L. The first ramp section can move about this pivot axis between an extended position (FIGS. 1-4) in which the ramp section extends laterally outward from the hinged connection at the respective side of the trailer frame, and a retracted position (FIG.

5-8) in which the ramp section stands upwardly from the hinged connection so as not to project laterally outward therefrom.

In the first illustrated embodiment, the ramp assembly 30a features a second ramp section 34 pivotally joined to the first ramp section by a second pivotal connection that defines another pivot axis parallel to that of the ramp assembly's first pivotal connection. The second ramp section 34 is thus foldable relative to the first ramp section 32 between an unfolded state (FIGS. 1-4) in which it forms a coplanar continuation of the first ramp section, and a folded state (FIGS. 5-8) in which it lies generally parallel to the first ramp section in face-to-face relationship therewith in a plane adjacent thereto.

As shown in FIG. 1, with the first ramp section 32 extended and the second ramp section 34 unfolded, these two ramp sections form a collective ramp that extends laterally outward from the trailer frame in the transverse direction. With the ramp assembly on the other side of the trailer frame likewise deployed in this manner, the two ramp assemblies 30a, 30b reach outward from opposing sides of the trailer frame in alignment with one another across the trailer frame. When the ramp assemblies are deployed in this manner, the collective ramp formed by the two sections of each assembly reaches laterally outward from the respective longitudinal beam of the trailer frame and the topside of this ramp slopes obliquely downward in the laterally outward direction to form a ramp surface gradually rising up to the plane of the topside of the trailer frame's longitudinal beams from the ground surface around the trailer.

A bridging platform 36 is mounted atop the longitudinal beams 12a, 12b of the trailer frame 10, or mounted between the longitudinal beams 12a 12b at a location placing a topside of the bridging platform coplanar with the topsides of the beams 12a, 12b. The platform 36 forms a bridge that spans across the open space between the longitudinal beams 12a, 12b in order to link together the first ramp sections of the two deployed ramp assemblies 30a, 30b across the topside of the trailer frame. The platform has a width (measured parallel to the longitudinal axis L of the trailer) that preferably spans the full width of the ramp assemblies (measured in the same direction). A cutout or opening 38 in the platform 36 is positioned adjacent the longitudinal beam 12a at one side of the trailer, and spans only a partial portion of the platform's width and a partial portion of the platform's span between the two longitudinal beams of the trailer frame. The opening 38 resides nearer to the one longitudinal beam 12a than to the other longitudinal beam 12b.

A longitudinal conveyor system 40 features a first horizontal belt conveyor 42 that runs in the longitudinal direction of the trailer frame from an area beneath the bridging platform 38, and extends toward, but stops short of, the opposing second end of the trailer frame. A second belt conveyor 44 extends from a location disposed beneath the end of the first conveyor 42 that is nearest the second end of the trailer, and continues onward toward the second end of the trailer in the longitudinal direction. However, the second belt conveyor 44 is inclined relative to the first belt conveyor 42 so as to slope upwardly away from the first conveyor toward the second end of the trailer frame. Use of the term horizontal in relation to the first belt conveyor is not meant to denote that this belt conveyor must lie specifically in an exactly horizontal plane, but rather is used to denote that this conveyor is oriented more horizontally than vertically, and more horizontally than the inclined second conveyor 44. Described in another way, the first belt conveyor 42 is more parallel to the plane of the trailer frame than the inclined second belt conveyor 44.

A bucket elevator 50 is mounted to the trailer frame at or near the second end thereof, for example supported atop the second end cross-beam 24 and supplementary support cross-beams that may lie parallel the second end cross-beam in close proximity thereto. The bucket elevator features an elongated housing structure 52 having first and second ends 54a, 54b spaced apart along a longitudinal axis L2 of the bucket elevator. The first end 54a is connected to the trailer frame by a hinge-type pivotal connection 56 having a mounting plate 56a fixed to the trailer frame at a topside thereof, and a supporting plate 56b fixed to the end of the bucket elevator housing 52. The two plates 56a, 56b are pinned together to allow pivotal motion between the plates about the axis of the pinned connection, which lies perpendicular to the longitudinal axes L, L2 of the trailer and the bucket elevator housing 52, and parallel to the transverse direction of the trailer in which the ramps extend when deployed.

The bucket elevator 50 and the pivotal connection 56 thereof to the trailer frame both lie on a side of the central vertical plane of the trailer that is opposite to the horizontal and inclined belt conveyors 42, 44. That is, the belt conveyor system and the bucket elevator are laterally offset from one another to lie side by side in the transverse direction, and reside on opposite sides of the central vertical plane of the trailer. FIGS. 1-4 show the bucket elevator 50 in an upright operational position in which the longitudinal axis L2 of the bucket elevator lies perpendicular to the longitudinal trailer axis L so that the bucket elevator housing stands vertically upright in a position seated atop the mounting plate 56a when the trailer frame is in a horizontal plane, thereby placing the second end 54b of the bucket elevator at a maximum achievable height above the trailer frame. With reference to FIGS. 5-8, the bucket elevator housing can be pivoted about the axis of its pivotal connection 56 to the frame into a lowered storage position in which the longitudinal dimension of the bucket conveyor lies generally horizontally along the longitudinal axis L of the trailer, thus placing the second end 54b into a lowered position near the plane of the trailer frame and proximate the hitch-equipped first end thereof.

In a conventional manner, the bucket elevator features a drive chain entrained about a pair of sprockets disposed near the opposing ends 54a, 54b of the housing in a closed loop path around these sprockets, whereby buckets carried on the chain are driven around this path by powered rotation of the drive sprocket near the first end 54a of the bucket elevator. An inlet opening of the bucket conveyor 52 is provided in the elevator housing near the first end thereof for entry of granular or particulate material into the elevator housing for scooping up of this material by the buckets as the buckets transition around the bottom end of the closed-loop path of the erected bucket conveyor from the downward moving side of the path to the upward moving side of the path. This inlet opening of the bucket conveyor is spaced a short distance from the first end of the bucket elevator along the longitudinal axis L2 thereof so as to reside at a short height above the lower first end of the bucket elevator when the elevator is erected into the upright operational position of FIGS. 5-8. The upper end 44a of the inclined belt conveyor 44 is disposed at an elevation slightly exceeding that of the inlet opening of the bucket elevator so that the inclined belt conveyor can feed its conveyed material into the elevator for subsequent lifting to the top end of the erected bucket elevator.

With the bucket elevator in the upright position, an outlet port 60 of the bucket elevator opens downwardly from the elevator housing on the downward travelling side of the endless loop path of the bucket conveyor a short distance below the second end 54*b* of the elevator housing. In the first illustrated embodiment, the outlet port 60 is located on the side of the elevator housing that faces away from the hitch-equipped first end of the trailer frame so that backing the trailer into a position placing its second end adjacent a storage bin or tank places the outlet port 60 close to the inlet of the bin or tank. Although not shown for the first embodiment, a discharge chute may be coupled to the outlet port 60 of the bucket elevator and have an actuator, such as a hydraulic cylinder, that is operable to move a discharge end of the chute relative to the outlet port 60 of the bucket elevator. This way, an operator can adjust the point of final discharge of granular or particulate material from the system without having to move the trailer.

Although not shown for the first embodiment, one or more hydraulic cylinders may be operably coupled between the trailer frame and the housing of the bucket elevator, for example by way of pinned connection of one end of each cylinder to the trailer frame at a distance from the axis of the elevator's pivotal connection 56 to the frame and pinned connection of the other end of the cylinder to the conveyor housing at a position also spaced from the elevator's pivotal connection 56 to the frame. The hydraulic cylinder provides powered lifting of the bucket elevator into the upright operational position of FIGS. 1-4, and controlled lowering of same into the lowered storage position lying longitudinally of the trailer frame alongside the longitudinal conveyor system 40, as shown in FIGS. 5-8.

Figure 5:
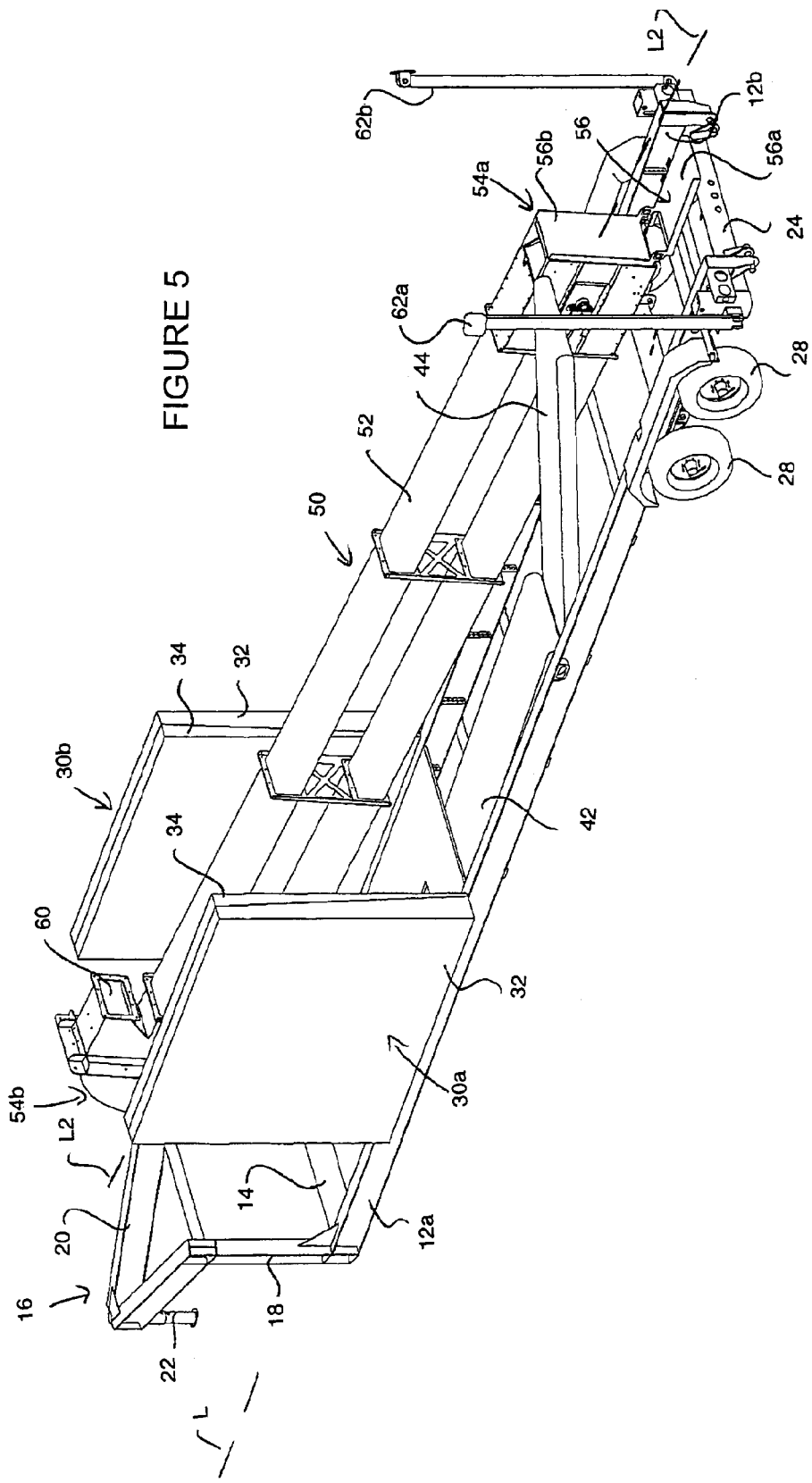
FIG. 5 is a perspective view of the first embodiment mobile conveyor system of FIG. 1, but in a collapsed state ready for transport.
Figure 6:
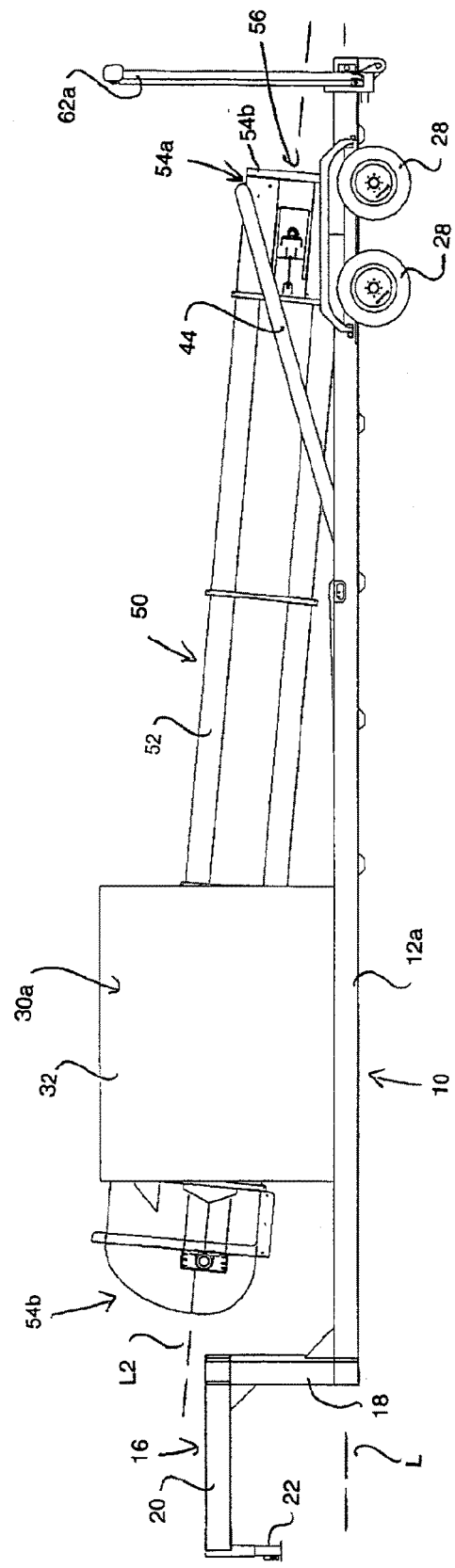
FIG. 6 is a side elevational view of the first embodiment mobile conveyor system of FIG. 5.
Figure 7:
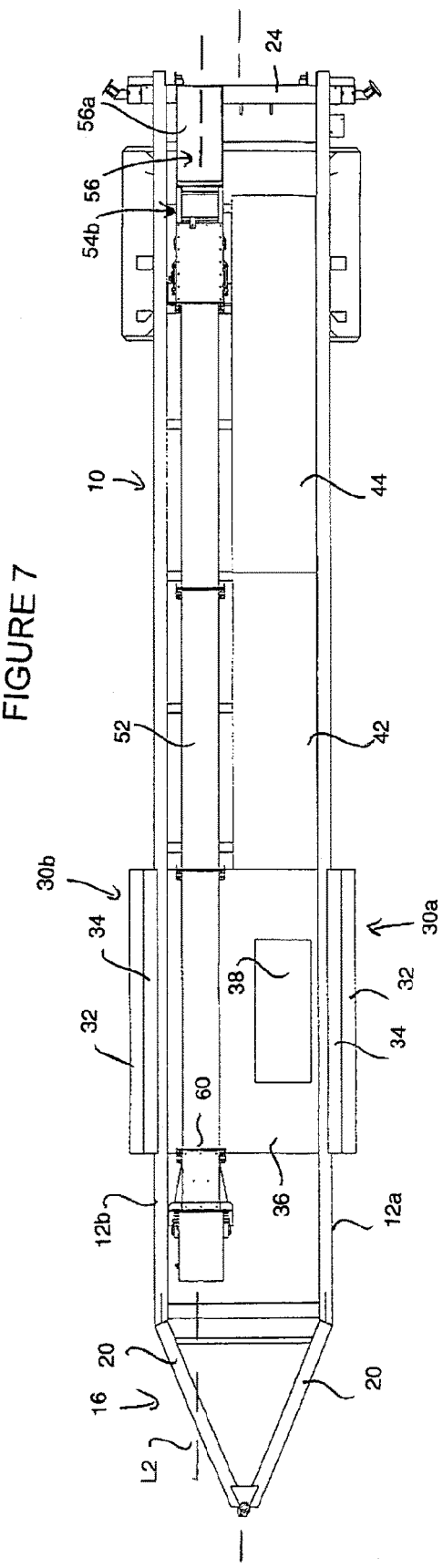
FIG. 7 is an overhead plan view of the first embodiment mobile conveyor system of FIG. 5.
Figure 8:
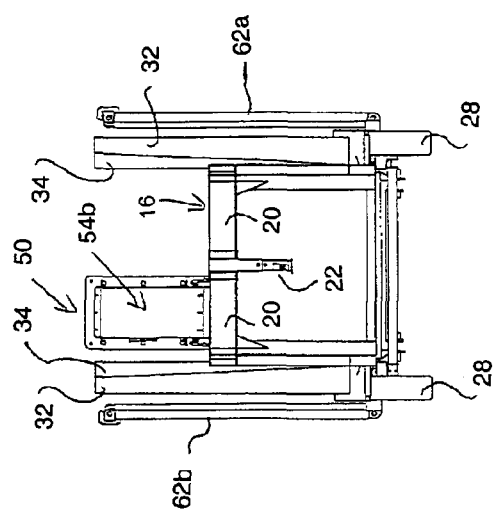
FIG. 8 is an end elevational view of the first embodiment mobile conveyor system of FIG. 5.

With reference to FIG. 5, the lateral offsetting of the bucket elevator 50 relative to the longitudinal belt conveyors allows the bucket elevator to fold down into the storage position while leaving the inclined belt conveyor 44 in its sloped position angling upwardly toward the second end of the trailer frame. With the ramp assemblies stowed in an upright orientation leaving an open space between them across the bridging platform, part of the bucket elevator is receivable within this space between the stowed ramp assemblies when the elevator is folded down into the longitudinal storage position.

A pair of outrigger arms 62*a*, 62*b* are mounted to the trailer frame adjacent the second end thereof at respective ones of the first and second longitudinal frame beams 12*a*, 12*b*. FIGS. 1-4 show the outrigger arms in extended or deployed positions reaching outwardly and downwardly from the trailer frame on opposite sides of the erected bucket elevator to place distal ends of the outrigger arms against the ground surface surrounding the trailer. So deployed, the outriggers brace the trailer against movement in order to provide improved stability during setup and/or use. The outrigger arms may feature pivot axes that are obliquely oriented relative to the longitudinal trailer axis L in horizontal planes so that the outriggers have directional components extending both laterally and longitudinally of the trailer frame when deployed, thereby resisting both roll and tilt of the trailer's longitudinal axis. As shown in FIGS. 5 to 9, the outrigger arms 62*a*, 62*b* are movable into retracted positions standing vertically upward from their pinned connections to the frame so as to minimize or avoid any contribution of the retracted outriggers to the overall trailer width.

FIGS. 5-8 thus illustrate a relatively compact transport state of the mobile conveyor system in which the ramp assemblies, bucket elevator and outriggers are all retracted inwardly toward the trailer frame relative to their deployed or extended positions, thus maximizing the suitability of the system for safe, easy road travel between different storage and operation sites.

When the trailer is towed to a site at which the conveyor system is to be employed, the trailer is parked in a position placing the second end of the trailer adjacent to the tank or storage bin that is to be filled with the granular material or particulate from a transport vehicle. The ramp assemblies and outriggers are deployed, and the bucket elevator is pivotally erected into its operational upright position, resulting in the ready-for-use operational state of the system shown in FIGS. 1-4. Fine tuning of the trailer position may be effected after the bucket elevator is raised if necessary.

A hopper-bottom or other bottom-discharge transport vehicle is driven up one of the ramps, and over the bridging platform onto the other ramp into an unloading position placing the outlet of the transport vehicle over the opening 38 of the bridging platform 36. The longitudinal belt conveyors 42, 44 are activated for driven operation thereof in an advancing direction in which the topside of the horizontal belt 42 moves toward an outlet end of this conveyor nearest the inclined conveyor 44 from an inlet region of the horizontal conveyor 42 located beneath the bridging platform. The topside of the inclined belt 44 continues in the same direction along the longitudinal trailer axis L from an inlet end of the inclined conveyor to the raised outlet end thereof nearest the bucket elevator 50. The bucket elevator is also activated, particularly for driven operation thereof in a lifting direction moving upward-opening buckets upward along the ascending side of the chain's endless path, and moving downward-opening buckets downward along the descending side of the chain's endless path.

With the transport vehicle parked in the unloading position, the bottom outlet of the transport vehicle is opened in order to allow granular material to fall from the vehicle through this outlet, and onward through the opening 38 in the bridging platform 36 and onto the horizontal belt conveyor 42 below. The granular material falling from the vehicle is conveyed by the horizontal belt 42 to the inclined belt 44, and onward via the inclined belt into the inlet of the bucket elevator 50, where the material is then lifted up to the top end 54*b* of the bucket elevator and discharged therefrom through the outlet port 60 thereof. From the outlet port 60, the granular material is fed into the storage bin or tank that is to be filled with the granular material, for example via a discharge chute if provided.

While the first illustrated embodiment shows a solid bridging platform 36, the cutout or other opening of which may be equipped with a grating of suitable strength to support the weight of a transport vehicle driven over the ramp assemblies, other embodiments may instead employ a grating-type structure as the entire drive-over bridging platform. However, use of solid platform material (lacking any openings or perforations) for the portion of the platform on the side of the central vertical plane opposite the belt conveyors may help minimize waste by ensuring that material is only allowed to flow downwardly through the bridging platform at the area thereof that directly overlies the horizontal conveyor.

While the first illustrated embodiment employs ramp assemblies in which each ramp section is a single-piece that fully spans an expected transport vehicle width, other embodiments may employ two-piece ramp sections, in which each of the two pieces of each section is driven over by only one wheel of every left-and-right wheel pairing of the transport vehicle. Such a ramp configuration arrangement would resemble the front and rear ramps of the aforementioned Bourgault patent, the entirety of which is incorporated herein by reference. Similar to said Bourgault patent, deployment and retraction of the ramp assemblies may be carried out using hydraulic cylinders.

FIGS. 9 to 12 show a second embodiment that likewise incorporates a bucket elevator and drive-over feed conveyor into a single towable implement, but in which the feeding conveyor and drive-over assembly are configured to allow the grain transport vehicle to drive over the inlet of the feed conveyor in a direction parallel to the longitudinal dimension of the trailer, rather than in a transverse direction perpendicular thereto. To accomplish this, rather than mounting the feeding conveyor and the ramp assemblies directly to the trailer frame 10', they are instead mounted on a separate framework 70 that is movably coupled to the trailer frame 10' in order to swing between a transport position stowed over the deck 72 of the trailer frame 10' and a deployed position extending laterally outward to one side of the trailer frame 10'.

Figure 13:
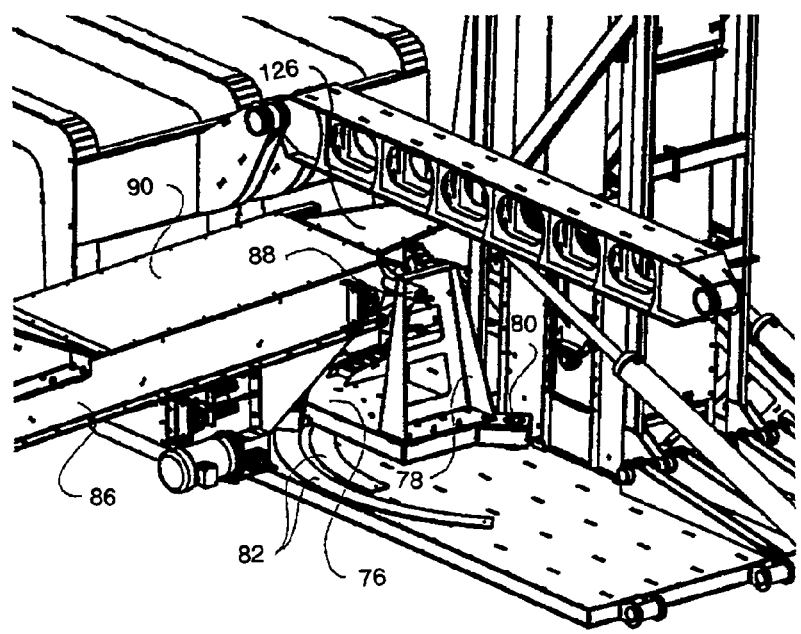
FIG. 13 is a partial close-up perspective view of the second embodiment mobile conveyor system showing movable connection between a conveyor framework and trailer frame thereof.

The framework features a stanchion 74 that stands upright from the deck of the trailer frame 10' near the first end of the trailer frame 10' at which the gooseneck structure 16' is defined. The stanchion 74 features a base plate 76 lying closely over the deck in parallel horizontal relation thereto, and two uprights 78 at opposing sides of the base plate 76. As best shown in the close-up view of FIG. 13, a pivot shaft 80 stands upward from the trailer deck 72 at a point that is located beside the bucket elevator 50 in the transverse direction of the trailer frame. The pivot shaft 80 defines a vertical pivot axis about which the stanchion 74 can pivot. Arcuate recesses 82 in the topside of the trailer deck are radially centered on this pivot axis, and rollers on the bottom of the stanchion base 76 reside in these grooves for rolling support of the stanchion throughout its movement about the pivot axis.

The conveyor framework 70 features two conveyor-supporting sections, referred hereafter as inner and outer sections. The inner frame section 84 features a pair of parallel beams 86 between which one belt conveyor is operatively supported to convey material in a conveyance direction parallel to these beams 86. This belt conveyor corresponds to conveyor 44 of the first embodiment, as it feeds into the inlet of the bucket conveyor 50, and thus is hereafter referred to as the feed section conveyor. A horizontal pivot shaft 88 passes through the two uprights 78 of the support stanchion 74 and pivotally carries one end of the inner frame section 84 and the feed section conveyor supported thereby. The feed section conveyor is not visible in the drawings, as a top plate 90 spans over the beams 86 and conceals the feed section conveyor beneath it.

The outer frame section 92 of the conveyor framework 70 likewise features two parallel beams 94 residing in the same vertical planes as the beams 86 of the inner frame section 84 that is connected to the stanchion 74. The outer frame section 92 likewise carries a respective belt conveyor, which corresponds to conveyor 42 of the first embodiment onto which the grain or other material is received from the transport truck, and is therefore referred to hereafter as the receiving section conveyor. The two belt conveyors are arranged generally end-to-end in a similar manner to the first embodiment, where the outlet end of the receiving section conveyor overlies the inlet end of the feeding section conveyor so that material conveyed from the transport truck by the receiving section conveyor is conveyed onto the feeding section conveyor, which in turn carries the material onward for discharge into the inlet of the bucket elevator 50.

A pivotal connection 96 is formed between the two conveyor frame sections 84, 92 and allows relative pivoting between them about a pivot axis that is perpendicularly transverse to the parallel beams 86 (and thus also perpendicular to the matching conveyance direction of the belt conveyors running along these beams). A bridging platform 36 like that mounted on the trailer frame beams of the first embodiment is likewise mounted atop the beams 94 of the outer conveyor frame section 92 in order to span from one to the other to form a bridge over the space between them. The bridging platform again features a cutout or opening 38 that overlies the inlet region of the receiving section conveyor that is mounted between the beams 94. The ramp assemblies 30a, 30b of the second embodiment are likewise mounted to the outer section beams 94 of the conveyor framework 70 instead of to the beams of the main trailer frame. The second embodiment illustrates how each ramp section 32', 34' of each ramp assembly 30a, 30b may be of the aforementioned two-piece configuration rather than single piece configuration illustrated for the first embodiment, whereby the tires on opposing sides of the transport vehicle ride on different ramp pieces on opposing sides of the opening 38 through which the grain, proppant or other material is dumped onto the receiving conveyor.

At the end of the conveyor framework 70 that is distal to the pivotally mounted support stanchion 74 and past the drive-over assembly formed by the bridge platform and ramp assemblies, a drive system 98 is mounted to the outer frame section 92 and features a pair of support wheels 100 for rolling support of this wheeled end of the conveyor framework. The wheels 100 are carried at opposing ends of a walking beam 102 that is pivotal about an axis that lies parallel to the beams 94 of the outer frame section 92 of the conveyor framework 70, whereby pivoting of the walking beam 102 allows the two support wheels to rise and fall relative to one another about this axis.

Figure 14:
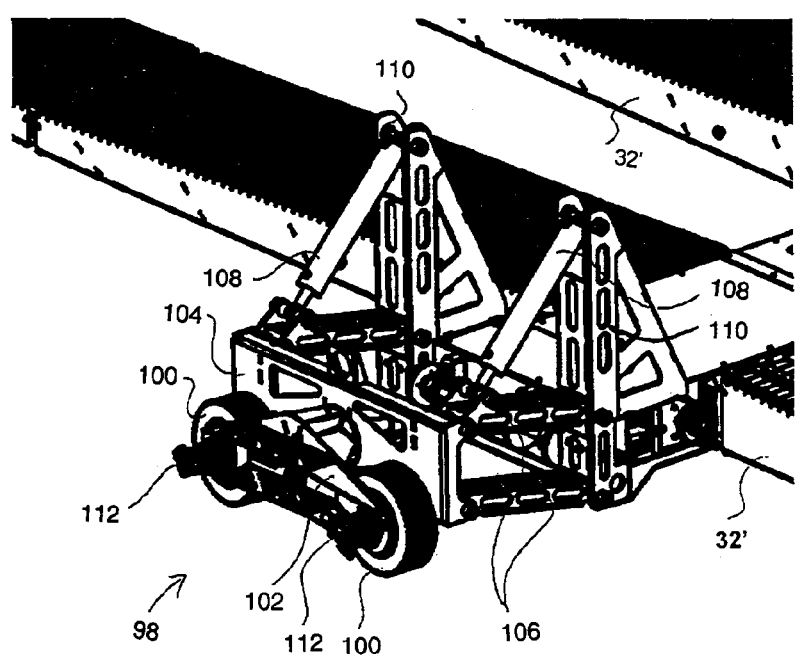
FIG. 14 is a partial close-up perspective view of the second embodiment mobile conveyor system showing a drive mechanism for repositioning the conveyor framework relative to the trailer frame for use in an extended positioning reaching laterally from the trailer and for transport in a stowed position atop the trailer.

The walking beam is pivotally mounted to a support plate 104 that lies perpendicular to the beams 94 at a distance beyond the ends thereof, and parallel to a cross-member of the outer frame sections that joins together these ends of the beams 94 at a location beyond the inlet end of the receiving section belt conveyor. A best seen in the close-up of FIG. 14, Each end of the support plate 104 is pivotally connected to the outer frame section 92 by a pair of equal-length parallel links 106 that reside in a vertical plane that is parallel to those of the conveyor framework beams 94. Accordingly, the support plate 104, links 106 and cross-member of the outer frame section 92 act to define a four bar parallelogram linkage by which the support plate can move up and down relative to the frame section 92 while maintaining an orientation parallel to the cross-member at the end of the frame section. A pair of hydraulic cylinders 108 each have opposing ends thereof connected to the support plate and a respective upright 110 that reaches upward from a respective one of the outer frame section beams 94, whereby extension of the hydraulic cylinders will force the support plate, and thus the walking beam 102 and attached support wheels 100, downward relative to the outer frame section 92.

The drive system 98 also features a pair of hydraulic motors 112, each mounted to the walking beam 102 in order to drive rotation of a respective one of the support wheels 100 about a wheel axis thereof that lies parallel to the pivot axis of the walking beam. With the driven support wheels 100 in contact with the ground or other underlying surface, and the cylinders 110 extended so that the downward force exerted on the support wheels 100 will lift the outer frame section 92 off the ground or other surface, driven rotation of the wheels 100 will thus move the conveyor framework about the axis of the stanchion's pivot shaft 80 on the trailer.

Figure 9:
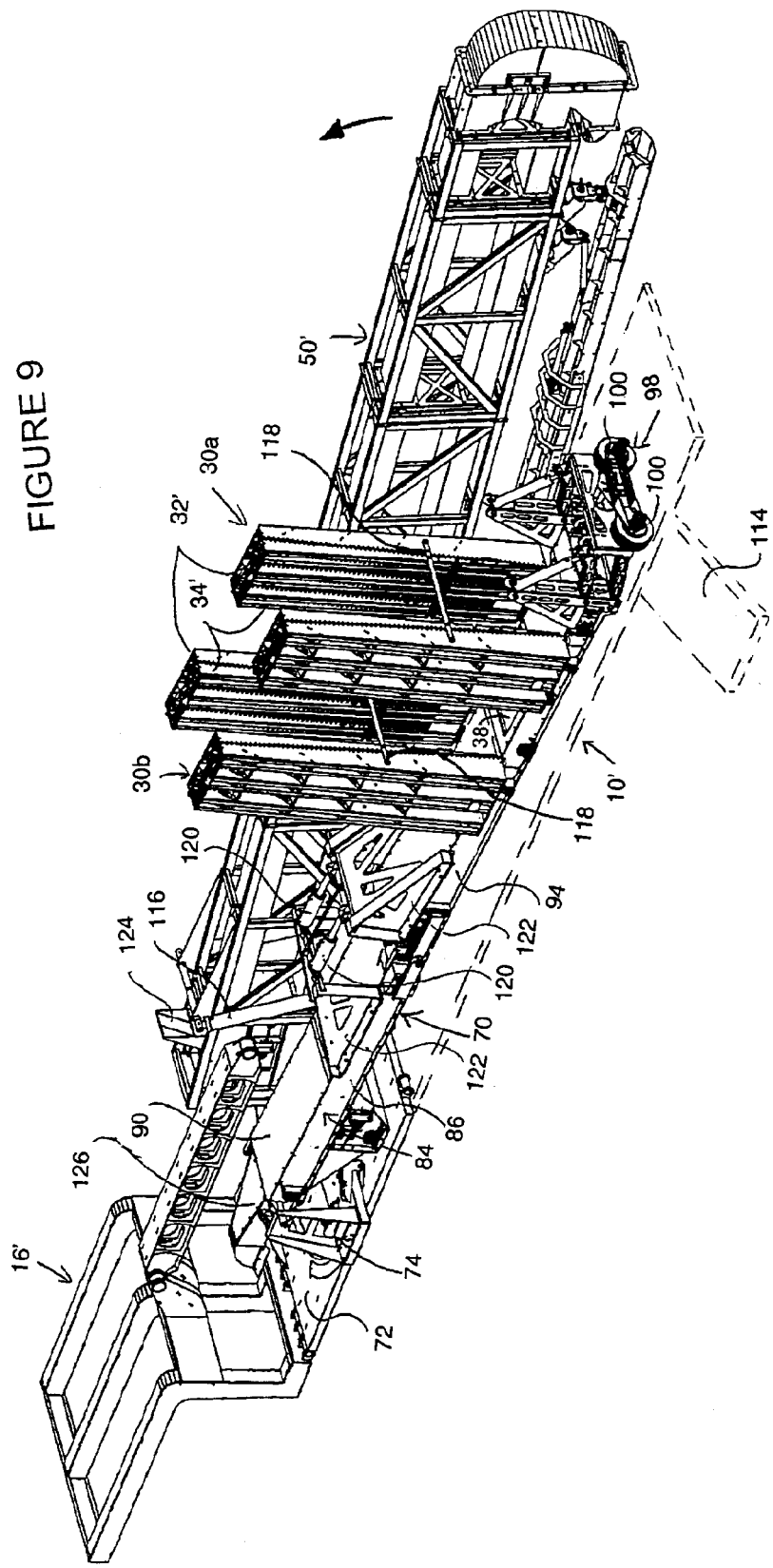
FIG. 9 is a perspective view of a second embodiment mobile conveyor system in its collapsed transport state.
Figure 10:
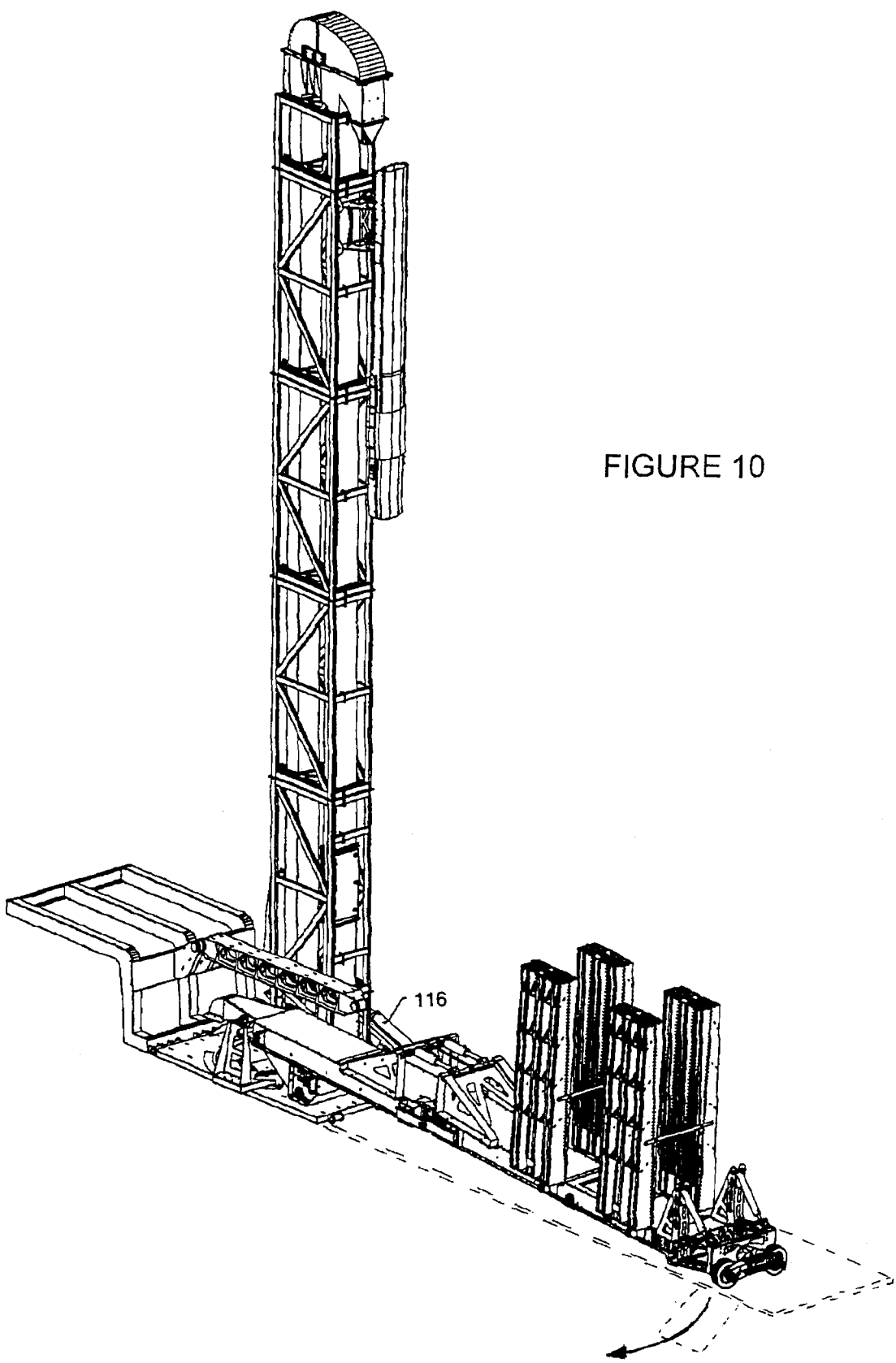
FIG. 10 is a perspective view of the second embodiment mobile conveyor system during a first stage of its transition from the collapsed transport state to its operational state.
Figure 12:
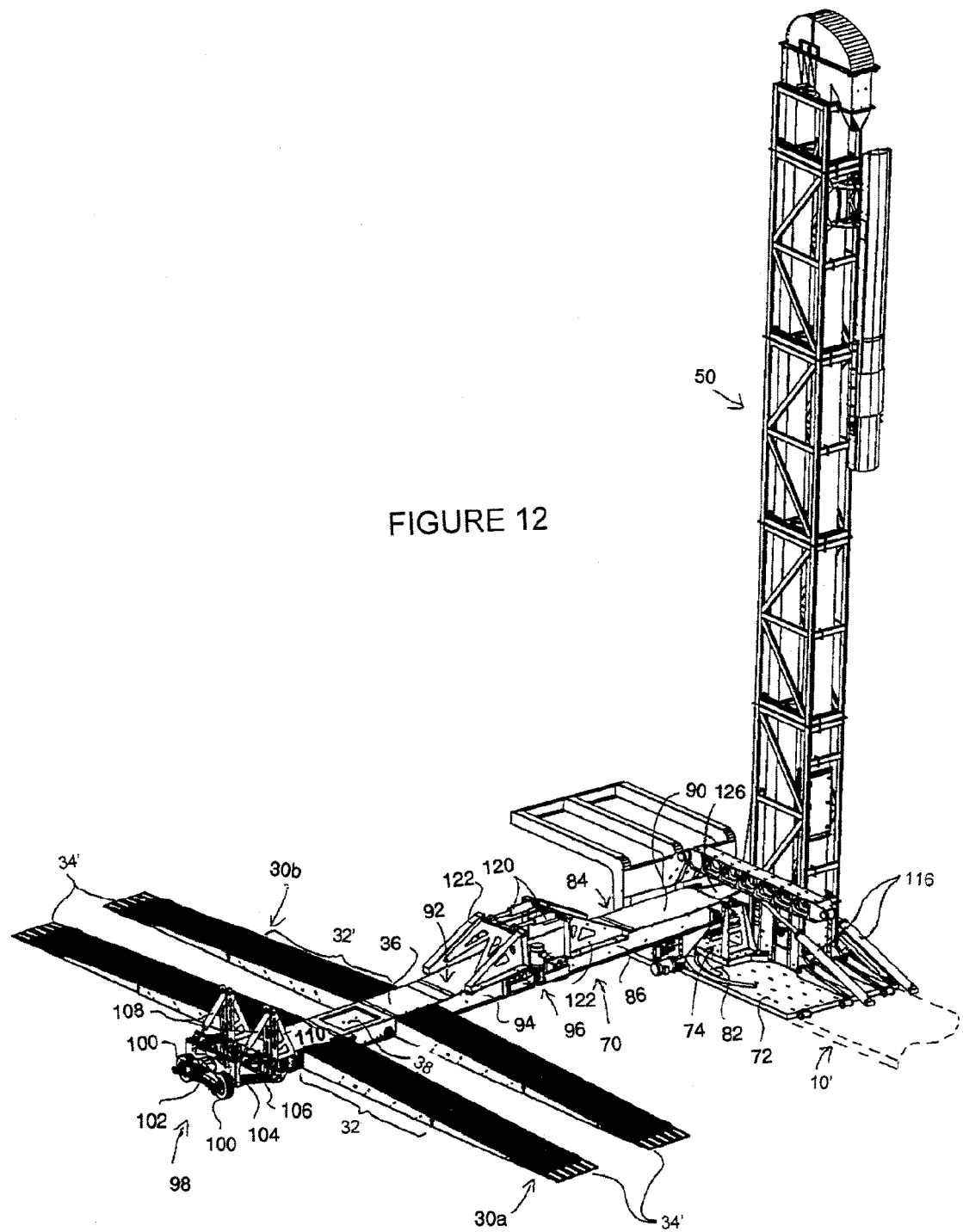
FIG. 12 is a perspective view of the second embodiment mobile conveyor system in its operational state.

As shown schematically in FIGS. 9 and 10, an access ramp 114 is provided for enabling transition of the wheeled end of the conveyor framework between the trailer deck 72 and the ground. This ramp 114 may be removably attachable to the trailer at the side thereof adjacent which the conveyor framework stanchion 74 resides, or may be permanently coupled to the trailer frame but movable between deployed and retracted/stowed positions. For example, slide rails lying transversely to the trailer's longitudinal direction may allow sliding of the ramp out to a position overhanging from the respective side of the trailer, where a pivotal hanger supporting one end of the ramp on the rails allows the other end of the ramp to swing down to the ground below the trailer deck.

The bucket elevator 50' is pivotally mounted to the trailer frame 10' at a position atop the deck 72 of the trailer in a manner similar to the first embodiment. However, in the second embodiment, the bucket elevator is mounted near the hitch-equipped front end of the trailer frame instead of near the wheel-equipped rear end. As a result, when hydraulic cylinders 116 coupled between the trailer and bucket elevator housing are extended, the bucket elevator 50' stands upright from the trailer beside the conveyor frame stanchion 74 that resides near the front end of the trailer frame. Controlled collapse of these same two-way hydraulic cylinders 116 lowers the upper outlet end of the bucket elevator down toward the rear end of the trailer frame, thus laying the bucket elevator down into a storage position lying closely over the trailer deck in nearly parallel relation thereto.

Having described the structure of the second embodiment, attention is now turned to its operation. FIG. 9 shows the mobile conveyor system 10' of the second embodiment in the transport state, in which the belt conveyors reside alongside the bucket elevator that lies in a lowered position along the longitudinal direction of the trailer. In this transport state, with the bucket elevator and feeder conveyor lying side by side in the tranverse direction of the trailer frame, the hydraulic cylinders 108 for raising and lowering the drive wheels 100 of the conveyor framework are kept in a fully collapsed state in order to place these wheels in a raised position relative to the conveyor framework, which acts to seat the wheeled outer end of the conveyor framework in a lowered position atop the deck of the trailer, thus minimizing the height of the conveyor framework atop the trailer. The ramp assemblies 30a, 30b are in raised/retracted positions at the respective sides of the conveyor framework, and stand upright from the beams 94 of the outer framework section 92 to which they are mounted. As shown, tie bars 118, cables, straps or the like may be used to connect the ramp assemblies together at a height above the conveyor frame in order to maintain these upright retracted positions of the ramp assemblies.

As a first step of preparing the system for use, the elevator raising/lower actuators 116 are extended in order to raise the outlet end of the elevator upwardly and forwardly (as shown by a solid headed arrow in FIG. 9), thereby raising the elevator into the operational position of FIG. 10. At this point, the access ramp 114 is deployed at the respective side of the trailer frame, and the wheel raising/lowering cylinders 108 of the drive system 98 at the wheeled end of the conveyor framework 70 are extended in order to force the support wheels 100 downward against the trailer deck 72, thereby lifting the wheeled end of the conveyor framework upwardly off the trailer deck. The hydraulic motors of these support wheels 100 are driven in a direction causing the wheels to drive the wheeled end of the conveyor framework about the upright pivot axis of the conveyor framework stanchion 74 in a direction toward and onto the access ramp 114, where the walking beam 102 will tilt and ride the ramp down to the ground on the support wheels 100. Continued driving of the support wheels 100 is carried out in order to continue swinging of the conveyor framework about the stanchion's pivot axis until the conveyor extends perpendicularly outward to the respective side of the trailer, as shown in FIG. 11.

At this point, the wheel raising/lowering cylinders 108 are collapsed in order to raise the support wheels 100 relative to the conveyor framework 70, thus laying the outer end of the conveyor framework down atop the ground. The pivotal connection 96 between the frame sections 84, 92 of the conveyor framework allows the outer frame section 92 to lay flat atop the ground, with the inner frame section 84 sloping upwardly from the outer frame section to the stanchion-supported end of the inner section atop the trailer deck 72. The outer frame section 92 is referred to as such due to its position spaced outwardly from the trailer frame when the conveyor frame resides in this swung-out deployed position reaching laterally from the trailer. The flat laying of the outer frame section 92 on the ground means that the next step of lowering the inner ramp sections 32 of the ramp assemblies down onto the ground (as shown by solid headed arrows in FIG. 11) will ensure that the ramp sections lie flat atop the ground in order to provide firm and stable ramp support needed to handle the drive-over action of the transport vehicle. The outer ramp sections 34 are then unfolded from atop the lowered inner ramp sections 32, thus resulting in the ready-to-use operational state of the system shown in FIG. 12.

The forgoing setup process is simply reversed in order to revert back to the compact transport condition of the system when the truck-emptying or bin-filling process is complete.

Additional hydraulic cylinders 120 extend between top-side brackets 122 at the hinged-together ends of the inner and outer frame sections 84, 92 of the conveyor framework 70. These cylinders 120 can be used to lock the positions of the two frame sections relative to one another about their pivotal connection 96 (for example, to maintain them inline with one another so that the conveyor framework extends linearly from its support stanchion to its wheeled end) while the conveyor framework is being lowered down off the trailer deck to the ground and swung out to the ready position of FIG. 11, at which point this locked condition can be released to allow the outer frame section to lie flat on the ground. When it is time to swing the conveyor framework back onto the trailer deck, the cylinders are extended in order to once again force the two sections into parallel alignment, and the pressure maintained in order to lock this positional relationship between them until the conveyor framework is safely stowed back atop the trailer deck.

Turning back to FIG. 9, an inlet tray 124 is provided at the inlet of the bucket conveyor housing on the side thereof that faces forwardly of the trailer frame (i.e. toward the hitch-equipped gooseneck end thereof) when the bucket conveyor is raised to its operational position. The outlet end of the feeding section belt conveyor feeds into a transfer chute 126 attached to the stanchion-supported end of the inner frame section 84 of the conveyor framework. This chute 126 tapers in the direction extending from the end of the inner frame section of the conveyor framework, and features a downward-opening outlet at its free end. The transfer chute 126 of the feed section conveyor and the pivot shaft of the conveyor framework stanchion are positioned so that after the bucket elevator has been erected, swinging of the conveyor framework out into the ready position acts to also swing the outlet of the transfer chute 126 over to the bucket elevator's side of the trailer deck and into a position residing over the inlet tray 124. Accordingly, the two belt conveyors collectively define a feeding conveyor that receives the grain or other material from the truck-fed drive-over inlet near the wheeled end of the deployed conveyor framework, and conveys it up over the side of the trailer and into the inlet of the bucket conveyor, from which the material is raised to the outlet of the bucket elevator for delivery into the grain bin or other storage structure.

FIGS. 15 to 24 illustrate a third embodiment of the present invention, in which the mobile conveyor system 10" has the same general layout as the second embodiment, in that the swing-out feeder conveyor framework 70 and the conveyor belts carried thereby, when stowed, lie beside the bucket conveyor 50' in the transverse direction of the trailer so as to extend in the longitudinal direction of the trailer in a vertical plane parallel to that of the stored bucket conveyor 50'. Although the general structure and operation of the third embodiment are the same as the second, the third embodiment features some modifications and additions to the second embodiment.

The third embodiment features a shorter version of the deck 72' on which the elevator 50' and pivotal stanchion 74 are mounted. Instead of extending the substantially full length of the trailer, the shorter deck 72' terminates at a short distance behind the mounted locations of the bucket elevator and pivotal stanchion. From here, an open trailer framework 200 instead spans the majority of the remainder of the trailer's length toward the rear-end thereof. The open framework features outer beams 202, e.g. steel I-beams, that define the outer sides of the trailer and a center beam 204, e.g. a webbed steel beam, lying centrally between the two outer beams. Each of these parallel beams 202, 204 runs longitudinally from the rear end of the deck 72' to a wheeled truck 206 that defines the rear end of the trailer. The webbed center beam 204 has its lower flanges situated level with those of the outer beams 202, but is taller than the outer beams so as to stand upwardly therefrom to form a barrier or divider between the bucket elevator 50' and the feeder conveyor when both are stowed in their storage positions. Cross-members of the trailer's open framework span transversely between the outer beams 202 and center beam 204 at spaced intervals therealong. A series of upright support stands 208 on one side of the center beam are of equal height to one another and support the outer frame section 92 of the conveyor framework 70 in a parallel position over the respective outer beam 202 of the trailer when the feeder conveyor is stowed for transport or storage. Another set of upright support stands 210a, 210b on the other side of the center beam 204 are used to support the bucket elevator 50' in the storage position, but are of unequal height to one another, instead increasing in height toward the rear end of the trailer. This way, the bucket elevator 50' lies at slight front to rear incline relative to the trailer frame when stowed, the reason for which is set out herein further below.

Figure 16:
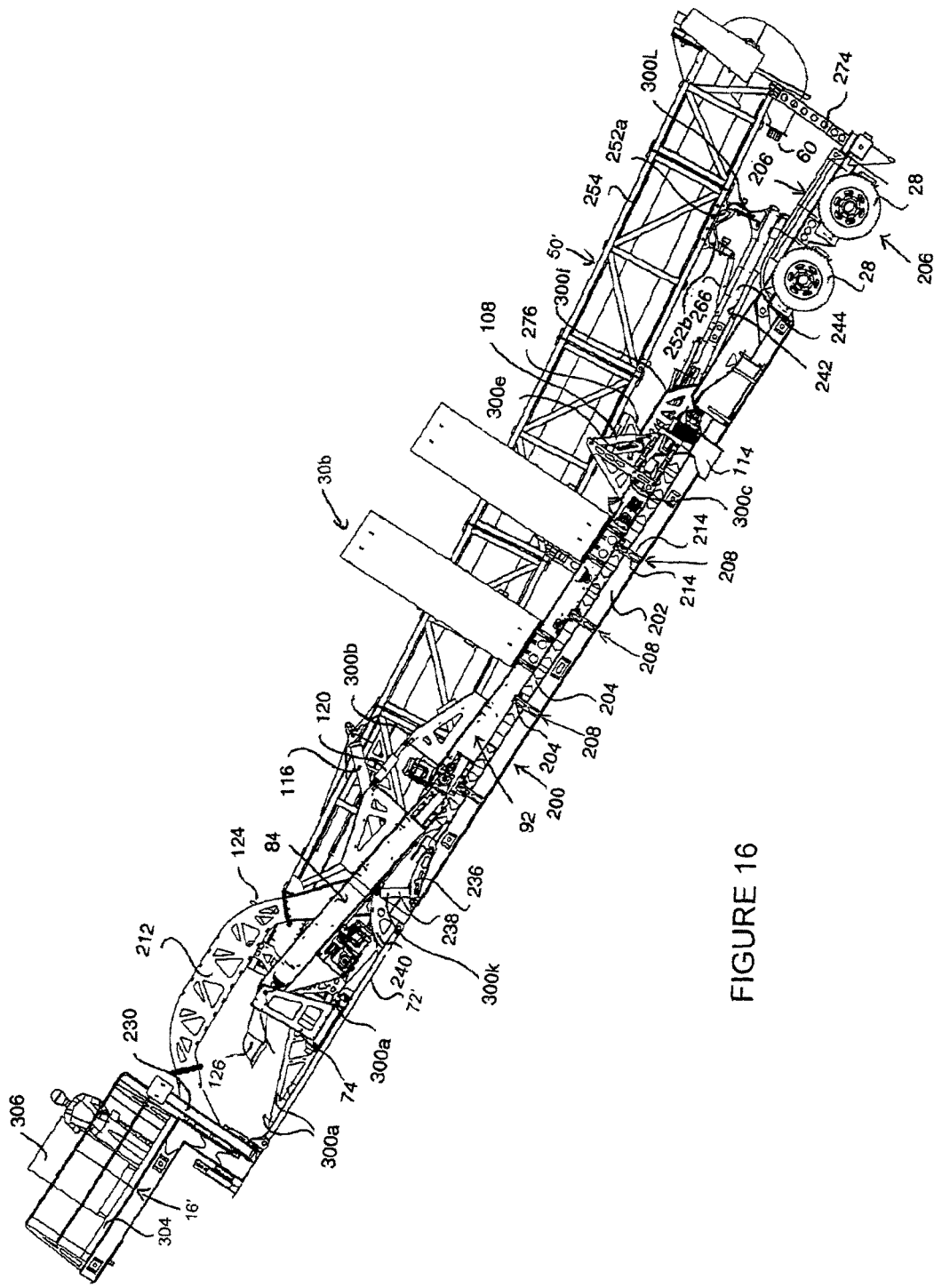
FIG. 16 is a side elevational view of the third embodiment mobile conveyor system in the collapsed transport state.

With reference to FIG. 16, to minimize the height of the deck 72' in order to keep the bucket elevator's center of mass as low as possible for optimal stability of the trailer, the deck of the third embodiment is a thick steel plate that lies generally coplanar with the bottom flanges of the longitudinal beams 202, 204 of the open trailer framework 200 behind it, and has no separate framework beneath it. Reinforcement is provided by an overhead beam assembly 212 that spans over the deck 72' in an arc-like manner from a center upright 18' of the gooseneck structure 16' to a fixed connection with the center beam 204 of the open framework 200 behind the deck 72'. In the illustrated embodiment, the deck 72' is connected to the gooseneck structure 16' in front of it and the open framework 200 behind it by horizontally pinned connections for ease of assembly, but does not pivot relative to either, due to the rigid overhead reinforcement subsequently fixed in place between the front gooseneck structure and rear open framework overtop of the deck 72' during manufacture. It will be appreciated that other assembly techniques may alternatively be employed during fabrication.

Figure 18:
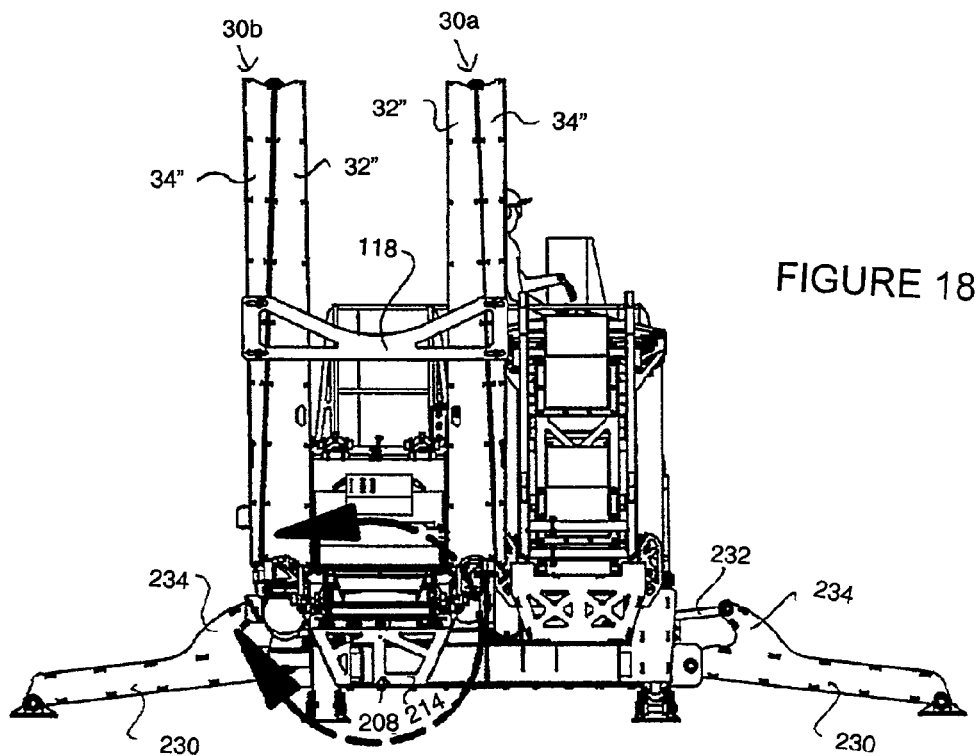
FIG. 18 is a cross-sectional view of the third embodiment mobile conveyor system of FIG. 17, as viewed along line A-A thereof.
Figure 19:
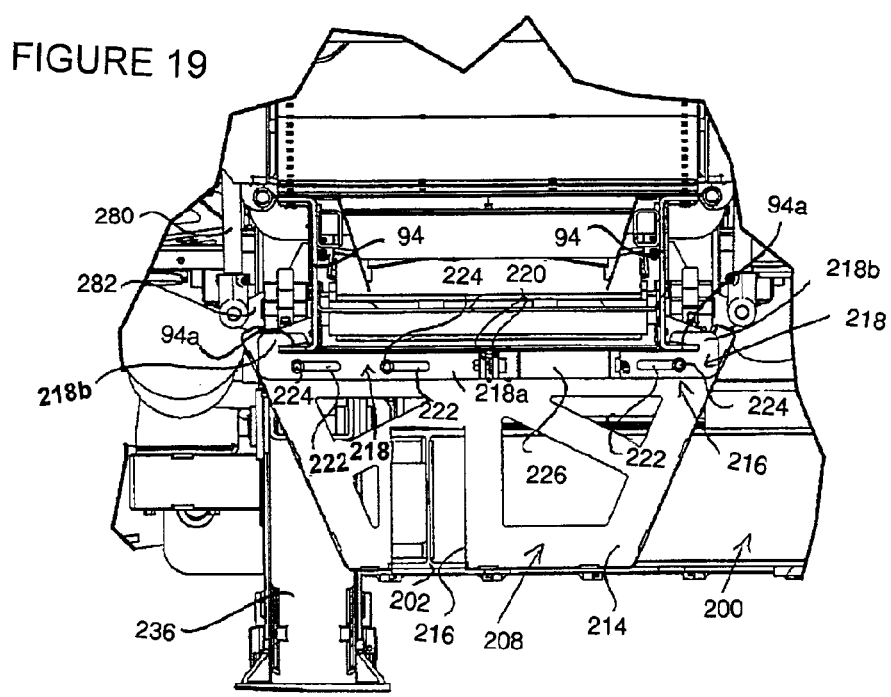
FIG. 19 is an enlarged detailed view taken from the cross-sectional plane of FIG. 18.

The cross-sectional views of FIGS. 18 and 19 reveal further details of the preferably identical support stands 208 on which the outer frame section 92 of the conveyor framework 70 is supported when stowed. Each stand 208 features two identical webbed plates 214 standing parallel to one another in vertical planes perpendicular to the longitudinal dimension of the respective outer beam 202 of the open trailer framework 200. Each webbed plate 214 is of generally trapezoidal shape oriented so that the longer of its two parallel sides defines a horizontal top edge of the plate. A rectangular cutout 216 juts into the webbed plate 214 from the shorter horizontal bottom edge thereof without reaching the opposing top edge of the plate. The cutout 216 fits over the outer beam 202 of the open trailer framework in order to support the horizontal top edge of the trapezoidal plate 214 at a short height above the beam 202. The parallel horizontal plates 214 of each support stand 208 are spaced a short distance apart in the longitudinal direction of the beam 202 in fixed positions relative to one another. At each support stand 208, the bottom flanges of the two beams 94 of the outer frame section 92 of the conveyor framework 70 are seated on the top edges of the webbed plates 214 when the conveyor framework is stowed. This is best shown in FIG. 19, where the two parallel longitudinal beams 94 of the outer frame section 92 of the conveyor framework 70 are channel-shaped C-beams whose bottom flanges 94a are seated atop the visible one of the two webbed plates 214 of the illustrated support stand 208.

At least one of the feed conveyor support stands 208 features a lock-down mechanism 216 for securing the conveyor framework 70 in place atop the support stands 208 when in the stowed position. Each lock down mechanism features two hooked plate members 218 slidably supported on one of the webbed plates 214 of the support stand 208 at the side thereof that faces away from the other webbed plate 214 of the same support stand 208. Each hooked plate member 218 has a linear portion 218a whose top edge lies parallel to the horizontal top edge of the trapezoidal webbed plate 2014 at the same, or slightly lower, elevation as this top edge of the webbed plate. The majority of each hooked plate member 218 is of planar form, lying parallel to the plane of the respective webbed plate 214 of the support stand 208. However, an inner end of each hooked plate member 218 near the center of the webbed plate's top edge is bent at ninety degrees relative to the planar remainder of the hooked member 218 so as to turn away from the webbed plate 214 and form a vertical flange 220 that extends in the longitudinal direction of the outer beam 202 of the open trailer framework 200. Each hooked plate member 218 is slidable toward and away from the flanged end 220 of the other hooked plate member along the top horizontal edge of the webbed plate 214. To accommodate this motion of the hooked members 218 relative to the webbed plate 214, and to restrain this relative motion to the prescribed direction, horizontal slots 222 in the linear portion of each hooked member 218 each fit over a respective guide stud 224 that projects perpendicularly from the face of the webbed plate 214. The hooked members 218 are thus hung on the webbed plate 214 by way of these studs 224, and are retained thereon by enlarged heads at the distal ends of the studs, whose diameters exceed the width of the slots 222 in the hooked member 218. The sliding interface between the studs 224 and the slots 222 allow the hooked members 218 to slide horizontally toward and away from one another in the transverse direction of the trailer.

The outer end of each hooked member 218 is coplanar with the linear portion 218 thereof, and has a hooked shape that turns back along the linear portion 218a of the member over a short partial distance thereof. As shown in FIG. 19, this hooked end 218b of each hook member 218 hooks over the bottom flange 94a of a respective one of the two parallel beams 94 of the frame section 92 of the conveyor framework 70, thereby achieving a locked condition of the lock down mechanism 216. To move the hooked members 218 into and out of this locked condition, the cylinder of a hydraulic linear actuator 226 is rigidly mounted to one of the hooked members 218. The piston rod of this actuator 226 passes through a hole in the flanged inner end 220 of the same hook member 218, and is attached to the the flanged inner end 220 of the other hooked member 218. As shown in FIG. 19, in the locked condition, the studs 224 of the left hooked member 218 reside at the left ends of the slots therein, and the studs 224 of the right hooked member 218 reside at the right ends of the slots therein.

Extension of the linear actuator 226, which in the illustrated configuration is mounted on the right hooked member, therefore pushes the left hooked member away from the right hooked member until the right ends of the slots in the left hooked member reach the respective studs 224. This action pushes the hooked end 218b of the left hooked member outwardly out of its locking position hooked over the lower flange 94a of the respective beam 94 of the conveyor framework 70. Once the movement of the left hooked member is stopped by the contact between the studs 224 and the ends of the slots, continued extension of the linear actuator 226 now forces the right hooked member in the opposite direction, until the studs 224 in the slots of the right hooked member reach the left end of the slots therein (only one slot and corresponding stud is visible in FIG. 19, as the other slot/stud combination is hidden behind the actuator 226). This action pushes the hooked end 218b of the right hooked member outwardly out of its lock position hooked over the lower flange 94a of the respective beam 94 of the conveyor framework, whereupon both beams 94 of the conveyor framework are now freely liftable from off the support stand 208 by lowering of the support wheels 100 of the drive system 98. When the conveyor framework is later re-seated on the support stands after use of the mobile conveyor system is complete, subsequent collapse of the linear actuator 226 pulls the left hooked member back into its locking position over the lower flange of the left beam of the conveyor framework, whereupon the abutment the of the studs 224 with the left ends of the slots 222 in the left hooked member means that continued collapse of the actuator into the fully collapsed state shown in FIG. 19 pulls the right hooked member back into its locked position over the bottom flange of the right beam of the conveyor framework. It will be appreciated that the terms left and right in the forgoing description of the lock down mechanism could be reversed, whether due to mounting the actuator on the other one of the two hooked members, or by viewing of the mechanism from the opposing side of the support stand 208.

Figure 17:
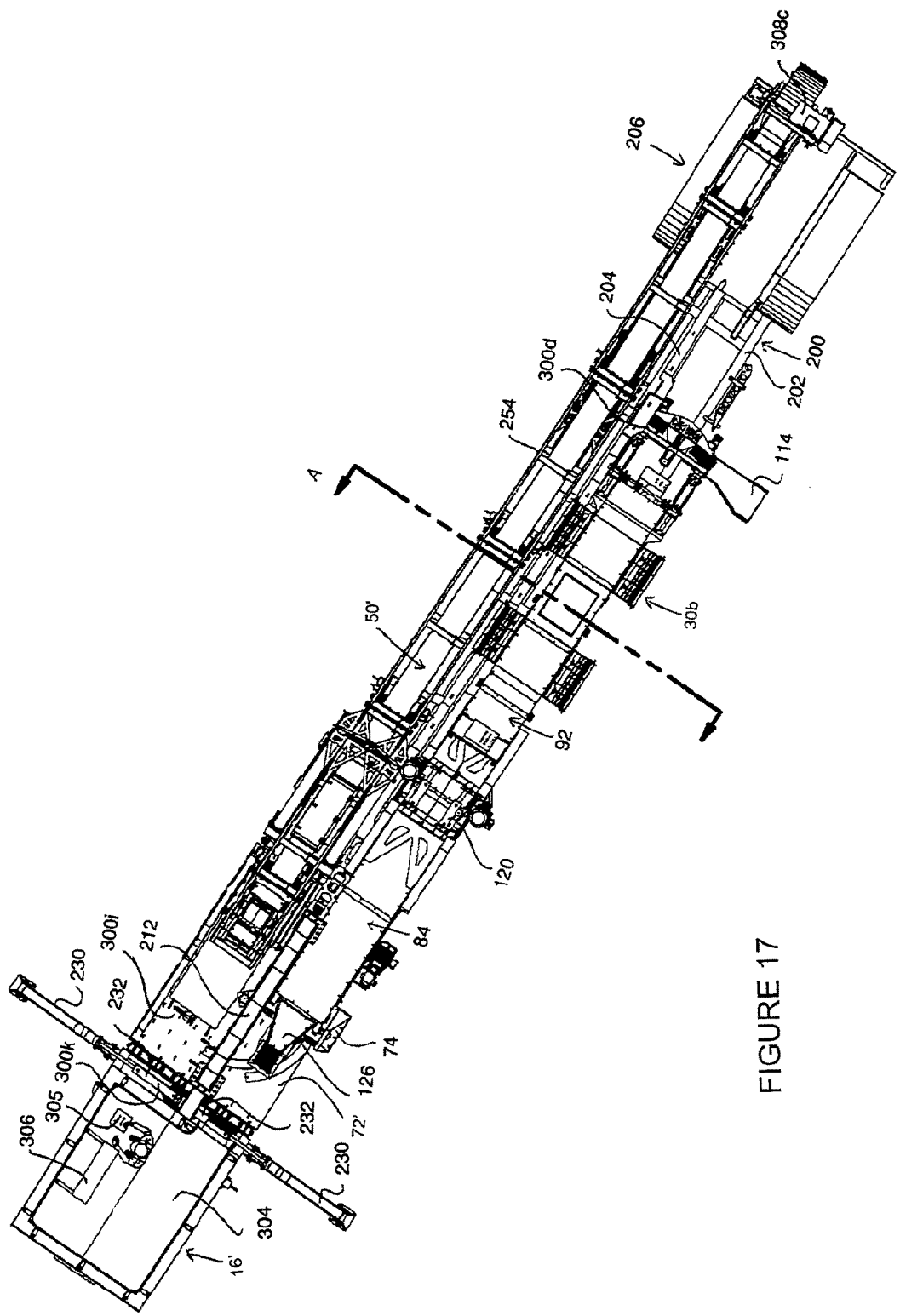
FIG. 17 is an overhead plan view of the third embodiment mobile conveyor system without outrigger support legs thereof deployed in a first stage of transition from its collapsed transport state to its ready operational state.

With reference to FIG. 21, a pair of outrigger support legs 230 are pivotally mounted to the trailer at the front of the deck 72' behind the uprights 18, 18' of the gooseneck structure 16' for pivoting thereof about respective pivot pins that lie longitudinally of the trailer at the respective outer sides thereof. For each front support leg 230, a respective hydraulic actuator 232 has one end pivotally coupled to the trailer near the transverse center thereof, and the other end pivotally coupled to an upright lug 234 of the outrigger support leg 230. Extension of the actuator 232 thus pivots the front support leg 230 downwardly into a position extending laterally outward from the trailer and sloping down to the ground to stabilize the respective side of the trailer in preparation for use of the conveyor system. In preparing the system for transport or storage, collapse of the actuator 232 raises the front support leg 230 out of contact with the ground into an upright position at the side of the trailer, in which the support leg 230 has zero or minimal protrusion outward from the sides of the trailer. For comparison, FIG. 16 shows the front support legs in their stowed upright positions, while FIGS. 17, 18 and 21 show them deployed out into contact with the ground to stabilize the trailer. With the angle of the front support legs controllable by the actuators 232, the front support legs not only stabilize the trailer, but are extendable and collapsible relative to one another to attain a level horizontal orientation of the deck 72' in the transverse direction of the trailer. This aids in establishing a truly vertical orientation of the upright bucket conveyor 50' when erected so that the weight of the raised bucket elevator 50' does not tip or destabilize the parked trailer about its longitudinal axis.

Figure 20:
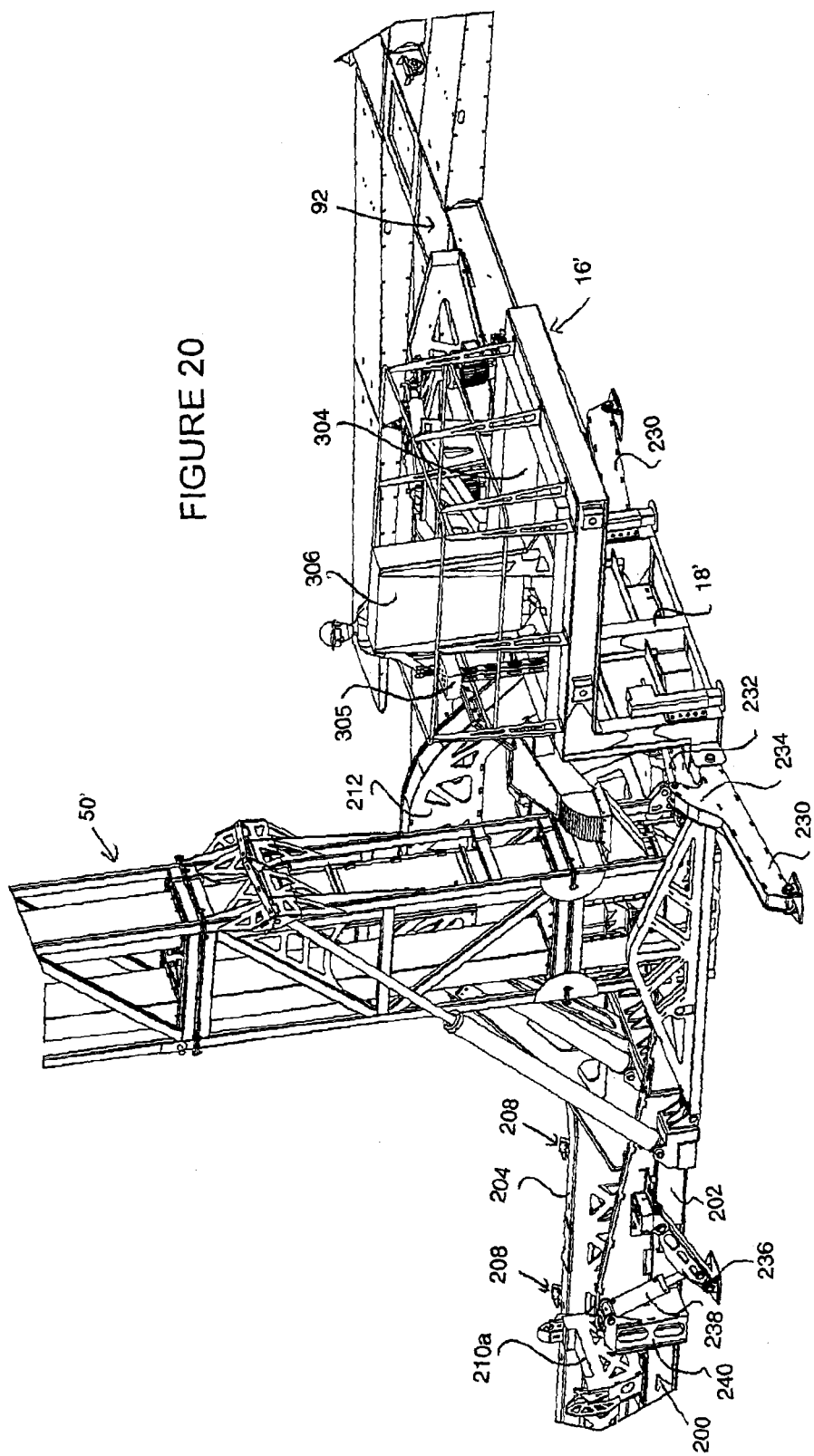
FIG. 20 is a partial view of the third embodiment mobile conveyor system of FIG. 15 from a front/side perspective.

FIG. 20 shows one of two rear support legs 236 that are provided at the opposing sides of the trailer at the where the front end of the open framework 200 connects to the rear end of the deck 72'. Each rear support leg 236 is carried on a respective one of the outer beams 202 of the open framework 200 by a pivot pin that lies transversely thereof. The rear support leg thus pivots in a plane lying longitudinally of the frame, instead of in a transverse vertical plane like the outrigger-style front support legs 230. For each rear support leg 236, a respective linear hydraulic actuator 238 has one end pivotally coupled to an upright 240 that is fixed to the outer side of either the deck 72' or the respective outer beam 202 of the open trailer framework 200, and the other end pivotally coupled to the rear support leg 236 at an intermediate point between its pinned end and its free distal end or foot. Extension of the hydraulic actuator 238 thus swings the support leg 236 downward into engagement with the ground. Like the front support legs 230, the rear supports legs 236 are used stabilize and level the trailer in the lateral or transverse direction. Relative adjustment between the front support legs and rear support legs can also be used to level the deck 72' into a proper horizontal orientation in the longitudinal direction of the trailer. In the illustrated embodiment, the rear support leg on the same side of the trailer as the bucket elevator 50' has its actuator connected to it from an upright 240 that is mounted to the outer beam of the trailer framework behind the support leg 236, as shown in FIG. 20, whereas the rear support leg 236 on the same side of the trailer as the feeder conveyor has its actuator connected to it from an upright that is mounted to the deck 72' in front of the support leg, as shown in FIG. 16. The different configuration on the elevator side leaves the rear end of the deck 72' available to accommodate a mounting of the lower end of the elevator-raising hydraulic actuator 116 at the outer side of the bucket elevator 50'. Use of the deck 72' to mount the upright on the other side of the trailer avoids the need for a cantilevered mounting of the upright in a position hanging out from the side of the outer beam 202, as used on the elevator side of the trailer.

Referring to FIG. 22, a discharge chute member 242 of the bucket elevator 50' is of a telescopically adjustable length, having a proximal section 244 and a distal section 246 that are slidably coupled together and collectively form an enclosed tubular passage from an inlet end 244a of the proximal section to an opposing discharge end 246a of the distal section. A flexible conduit 248 is connectable between the downward opening outlet port 60 at the upper outlet end of the bucket elevator 50' and the inlet end 244a of the discharge member 242. The flexible conduit 248 conveys material from the bucket elevator 50' into the discharge member 242, while its flexible configuration allows it to accommodate relative movement between the discharge member 242 and the bucket elevator 50'. To enable such movement of the discharge member 242, a pair of mounting brackets 252a, 252b extend laterally outward from the frame 254 of the bucket elevator 50 at a short distance below the downward-opening outlet port 60, which resides on a side of the bucket elevator frame 254 that faces longitudinally toward the rear end of the trailer when the bucket elevator is raised, and faces downwardly toward the open trailer framework 200 when the bucket elevator 50' is lowered for storage.

Using the terms upper, lower and vertical with reference to the upright operational position of the bucket conveyor 50', an upper one of the mounting brackets 252a has a pivot pin passing vertically through it to connect a link 256 to the bracket 252a in a manner allowing pivoting of the link 256 about the vertical axis of the pivot pin. A distal end of the link 256 opposite its pinned connection to the upper mounting bracket 252a features a horizontal pivot pin 258 connecting it to a pair of mounting lugs on the underside of the proximal section 244 of the discharge member 242, whereby the discharge member can pivot relative to the bucket elevator frame 254 about the horizontal axis of pivot pin 258. The lower mounting bracket 252b features a respective vertical pivot pin that is aligned with that of the upper bracket 252a, and to which one end of a respective link 262 is connected to allow pivoting of the link 262 about the vertical axis of the pivot pin of the lower bracket 252b. The distal end of this lower link 262 features a horizontal pivot pin 264 connecting it to a hydraulic linear actuator 266, the other end of which is pivotally connected to the proximal section 244 of the discharge member 242 by another horizontal pivot pin 268. As shown in FIG. 22D, another hydraulic linear actuator 270 has its two ends pivotally coupled to the bucket elevator frame 254 and the upper link 256 by respective vertical pivot pins by which the upper link 256 can swing about the vertical pivot pin of the upper mounting bracket 252a under extension and retraction of this actuator 270.

Through this actuator controlled connection to the frame 254 of the bucket elevator 50', the discharge member 242 is movable relative to the elevator frame 254 about the vertical axis shared by the pivot pins of the two mounting brackets, and also about the horizontal axis of the pivot pin 258 between the upper link 256 and the discharge member 242. Accordingly, the discharge end 246a of the discharge member 242 is movable about two perpendicular axes to allow relocation thereof to various positions in 3D space. Another hydraulic linear actuator defines a third discharge member actuator 270, whose opposing ends are respectively attached to the proximal and distal sections 244, 246 of the discharge member 242. This actuator 270 lies parallel to the longitudinal axis of the internal conduit of the discharge member, whereby extension and collapse of this actuator 272 slides the two telescopically mated sections 244, 246 relative to one another in order to lengthen and shorten the longitudinal dimension of the overall discharge member 242 between the inlet and discharge ends 244a, 246a thereof, thereby providing further control over the positioning of the discharge end 246a of the discharge member 242 relative to the output port 60 of the bucket elevator 50'. When actuator 270 is adjusted to place the discharge member 242 in alignment with the bracket-equipped side of the elevator frame 254, collapse of actuator 266 pulls the discharge end 246a of the discharge member 242 inwardly toward the elevator frame 254, thus establishing a collapsed position of the discharge member 262 lying generally parallel to the bracket equipped side of the elevator frame 254.

Figure 15:
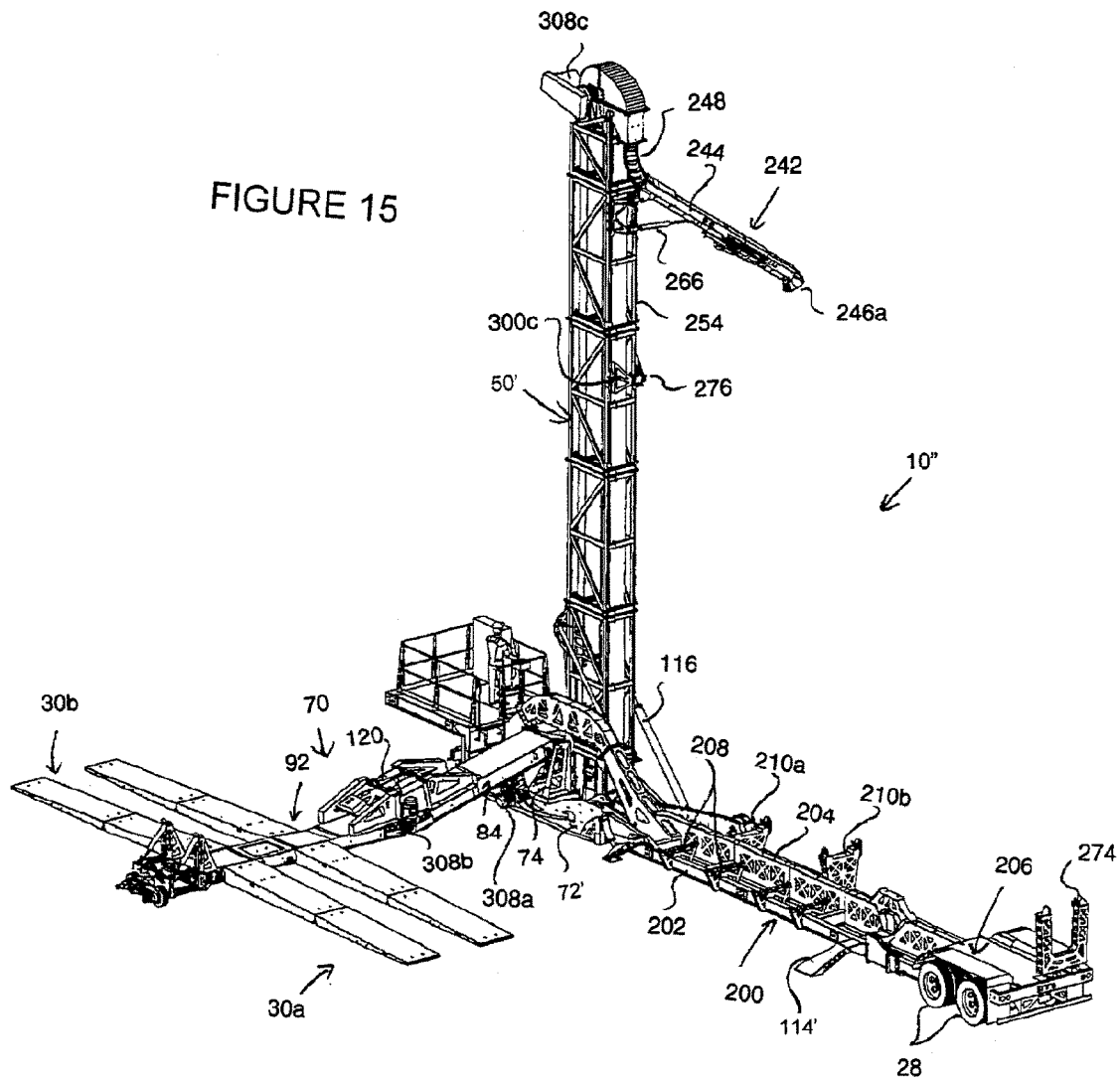
FIG. 15 is a perspective view of the operational state of a third embodiment mobile conveyor system that shares the same general layout as the second embodiment, but with additional features and greater illustrative detail.

As shown in FIG. 16, when the bucket elevator is lowered into the storage position, the collapsed discharge member 242 resides in a space between the bucket elevator 50' and the trailer so as to overlie the rear end of the open trailer framework 200 and the wheeled rear truck 206 connected thereto. To create such a space when the bucket conveyor is stowed, the rear one 210b of the elevator support stands 210a, 210b on the trailer frame is taller than the other so that the bucket elevator 50' lies at a slight incline from front to back in the storage position to accommodate the collapsed discharge member 242 when the conveyor frame 254 is laid down atop the support stands 210a, 210b. A further support 274 for the stowed bucket elevator 50' reaches upwardly from the rear end of the wheeled truck 206, and has a U-shaped structure, as seen in FIG. 15. This U-shaped rear support 274 thereby supports the lowered bucket elevator frame 254 on opposite laterally-facing sides thereof, while leaving a space between the two uprights of the support 274 to accommodate an outlet section of the bucket elevator housing that leads to the outlet port 60. All the support stands 208, 210a, 210b, 274 for the bucket elevator and the feeder conveyor preferably feature downwardly converging guides on opposing sides of each support in order to encourage the frames of the bucket elevator and feeder conveyor into properly centered positions on the support stands as they are lowered down onto same.

Referring to FIG. 15, a pair of additional brackets 276 are mounted to the elevator frame 154 further down from the discharge chute mounting brackets 252a, 252b on the same side thereof. These additional brackets 276 are spaced apart across this side of the elevator frame in order to straddle opposing sides of the discharge chute 276 when stowed in the collapsed position along this side of the elevator frame, whereupon an automatic locking mechanism is operable to secure the discharge member 242 in the collapsed position. When the bucket elevator 50' is in the raised operational position, then extension of actuator 266 swings the discharge end 246a upwardly and outwardly away from the bucket elevator frame, whereupon actuator 270 can be used to swing the discharge member 242 horizontally to a desired angle radiating outwardly away from the bucket elevator, as shown in FIG. 15. An operator can thus carefully aim the discharge opening 246a at the target destination, such as the fill port of a storage bin.

An additional pair of linear hydraulic actuators 280, one of which can be seen in FIG. 19, are provided for deployment and retraction of each ramp assembly 30a, 30b. Each ramp deployment actuator 280 has one end pivotally connected to a laterally projecting lug 282 on the outer side of the respective outer beam 202 of the trailer's open framework 200, and the other end pivotally connected to a respective lug (not shown) at an underside of the inner ramp section 32" that faces laterally outward from the conveyor framework in the stowed position and downwardly toward the ground in the deployed position. Extension of the ramp deployment actuators pivots the inner ramp sections outward from the conveyor frame 70 toward their deployed positions. In the third embodiment, the inner ramp section 32" lies nearest the transverse center of the conveyor framework 70, with the outer ramp section 34" folded up on the outside (i.e. underside) of the inner ramp section when the ramps are stowed. In this embodiment, the outer ramp sections thus fold under the inner ramp sections, unlike the second embodiment in which they fold over the inner ramp sections, and thus lie inwardly of the outer ramp sections when stowed.

With reference to FIGS. 16 and 17, a plurality of sensors are mounted throughout the system to monitor positions of movable components, and other conditions that may be pertinent to safety or operational factors. A series of conveyor framework position sensors 300a mounted on the deck 72' monitor the deployed-or-stowed positional status of the feeder conveyor by monitoring the rotational position of the stanchion 74 about its upright axis, which reflects whether the conveyor belts are stowed overtop the trailer, or have been swung out to lie perpendicularly of the trailer in the lateral direction. A conveyor framework articulation sensor 300b at the actuator-controlled pivot connection between the two frame sections 84, 92 of the conveyor framework 70 detects the angular relationship between the two frame sections, which reflects on whether the outer frame section has been laid flat atop the support stands 208 when stowed, or flat atop the ground when deployed. A wheel height sensor 300c at the drive system 98 at the end of the outer frame section 92 of the conveyor framework 70 detects whether the support wheels 100 thereof are raised or lowered, thereby further reporting on whether the outer frame section has been laid flat. A support wheel position sensor 300d is provided at a platform atop the open trailer framework 200 that aligns with the ramp 114 by which the feeder conveyor is driven onto the trailer by the support wheels 100. This sensor 300d detects the arrival of the support wheels on the platform, which compliments the detected stanchion position in determining that the feeder conveyor is properly stowed on the trailer. A discharge chute position sensor 300e is provided at chute lockdown brackets 276 to which the discharge member is secured by a locking system when collapsed. This sensor 300e is used to confirm the receipt of the discharge member in this collapsed and secured condition. A discharge chute extension/collapse sensor 300f at the extendable/collapsible telescopic coupling of the proximal and distal sections 244, 246 of the discharge member 242 are used to detect collapse thereof to its minimal length, which may be used to ensure alignment of the locking system at lockdown brackets 276 with corresponding lock engagable features on the discharge member 242. A discharge member alignment sensor 300h at the connection between the discharge member 242 and the elevator frame 254 detects the rotational position of the discharge member about the pivot axes of the two mounting brackets 252a, 252b on the elevator frame 254 to confirm receipt the discharge member in alignment with the respective side of the elevator frame when collapsed. Elevator position sensor 300i at the deck 72' detects the erected state of the bucket elevator, and preferably an automatically locked state of same when so raised. One or more tilt sensors 300j at the deck 72' are operable to detect a horizontally level state of the deck 72' in both the longitudinal and transverse directions, and to detect deviations from same. A pressure sensor 300k on the linear actuator of each deck support leg 230, 236 is operable to measure the hydraulic pressure inside the actuator. A determination that this pressure exceeds a certain threshold is used as confirmation that the respective deck support leg 230, 236 has been successfully deployed into contact with the ground to stabilize the trailer deck 72'.

The types of sensors employed for monitoring these various conditions, and the particular locations at which they are mounted, may be varied, and so they are illustrated only schematically without specific detail. For example, positional sensors may include mechanical contact sensors, angular/rotary position sensors, and/or through-beam, reflective or proximity-sensing optical/photoelectric sensors. The tilt sensing functionality for determining a level or unlevel state of the deck may employ, for example, a single 2-axis tilt sensor, two single-axis tilt switches, or an accelerometer from which tilt conditions can be determined.

Figure 24:
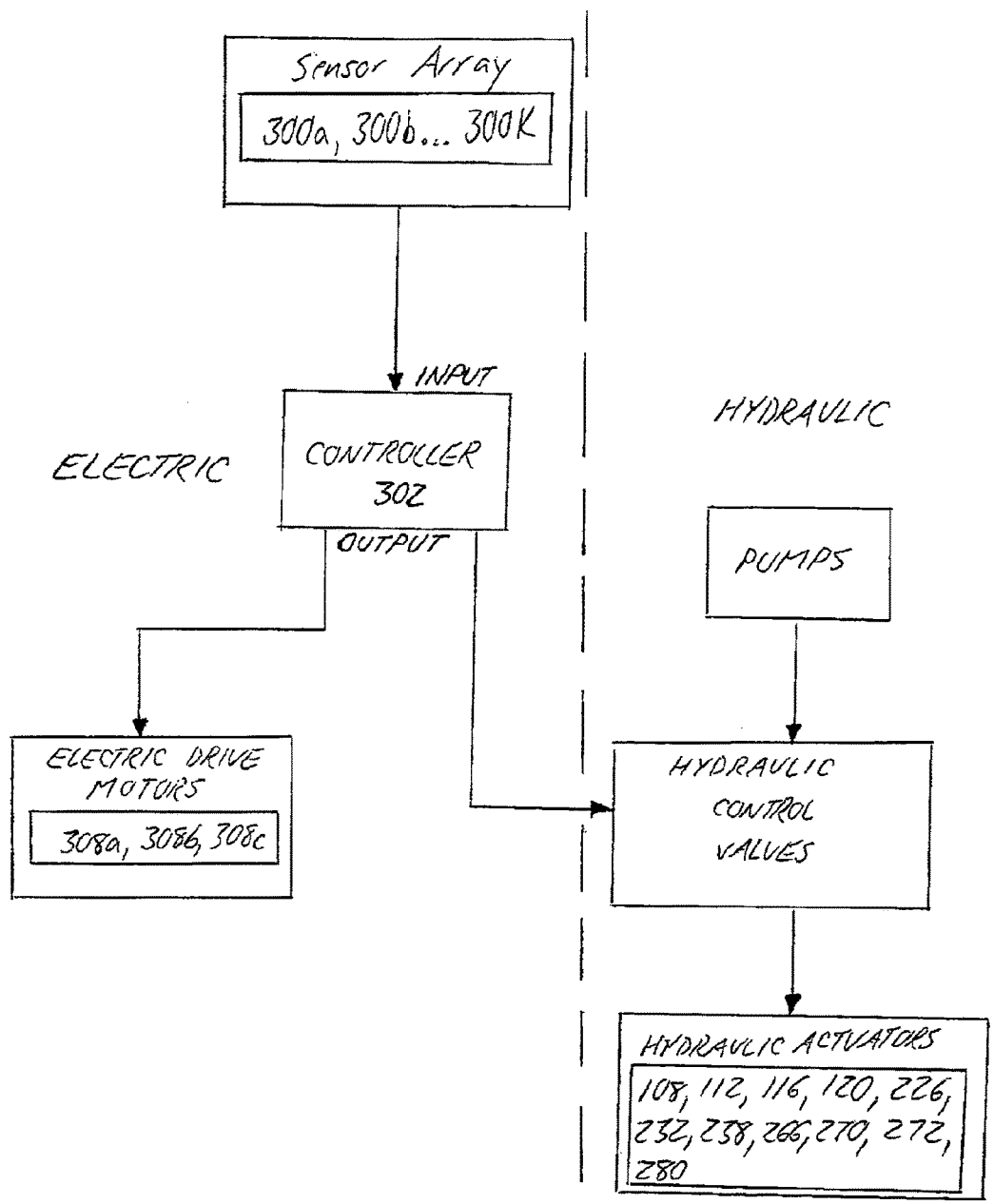
FIG. 24 is a schematic illustration of a control system operable to dictate a particular deployment and collapse procedure to be followed by an operator during setup and tear down of the third embodiment mobile conveyor system.

FIG. 24 schematically illustrates a control system of the third embodiment, in which a programmable logic controller (PLC) or other central controller 302 receives incoming signals from the forgoing array of sensors, and uses the same to perform automatic operations that either directly control components of the mobile conveyor system, or affect the ability to carry out particular tasks based on input from a user or operator. As illustrated in FIG. 20, an operator platform 304 may be mounted atop the gooseneck structure 16' at the front end of the trailer, and feature an operator control panel 305 with manual controls over hydraulic and electric components of the system. The controller 302 may be mounted in a heated cabinet 306 on the operator platform 304 for use in cold weather applications. Turning back to FIG. 24, the controller 302 has a set of outputs connected to electric drive motors 308a, 308b, 308c of the two belt conveyors and the bucket elevator, and another set of outputs connected to various valves in one or more hydraulic control circuits that are connected between one or more hydraulic pumps and the various hydraulic actuators of the mobile conveyor system. The hydraulic pump(s) may be on-board components of the mobile conveyor system, for example powered by an electrical generator mounted somewhere on the trailer, or part of a separate vehicle to which supply and return lines of the portable conveyor system are coupled.

For safety purposes, in a preferred embodiment the controller is programmed to force the operator to follow a particular setup or deployment routine when preparing the system for use, and a particular tear-down or collapse routine when preparing the system for transport or storage after use. In the initial collapsed state of the system, with the belt conveyors and the bucket conveyor stowed and secured in place on their respective support stands 208, 210a, 210b, electronically controlled valves in the hydraulic paths to the actuators are defaulted to closed positions to prevent actuation of any actuators, except for the actuators 232, 238 of the deck stabilization support legs 230, 236. The operator can accordingly use hydraulic controls only to adjust these actuators 232, 238 to extend the support legs into ground-engaging conditions stabilizing and leveling and the deck 72'. Once the controller receives confirmation of a level state of the deck 72' in both the longitudinal and lateral directions from the deck tilt sensor(s) 300j, and confirmation of deployment of all four support legs 230, 236 into contact with the ground by the support leg pressure sensors 300k, the controller then opens one or more valves to allow the operator extend the elevator raising actuators 116 and raise the bucket elevator 50' into the operational position. Once confirmation of the raised operational position of the bucket elevator, and preferably confirmation a locked status of same in this position, is received from the elevator position sensor 300i, then one or more valves of the hydraulic control system may be opened to allow control of the discharge member actuators 266, 270, 272 in order to enable the operator to position the discharge opening 246a according to a target destination of the particulate material that is to be conveyed by the system.

At this point in the setup process, with continued confirmation of the secured upright position of the bucket elevator and the level status of the deck 72', one or more control valves are automatically opened by the controller 302 to either allow extension of the lock down mechanism actuator(s) 226, or automatically extend same, in order to release the locked-down condition of the outer frame 92 of the conveyor framework 70. At this point, the controller 302 then opens valves in the control circuit that enable hydraulic flow to the wheel lowering actuators 108 of the drive system 98 and frame aligning actuators 120 so that the operator can use these actuators to lift up the distal end of the conveyor framework on the support wheels 100 and lock the two frame sections into alignment with one another. With this lifting and alignment of the frame sections 84, 92 confirmed by the framework articulation sensor 300b, the controller then opens one or more valves to allow activation of the hydraulic motors 112 of the support wheels 100 of the conveyor framework in order to allow the conveyor framework to be driven off the trailer via the ramp 114 (a deployed position of which may first require detection of by a respective sensor before the controller enables activation of the wheel motors 112). The ramp deployment actuators 280 are prevented from being extended until the controller 302 receives confirmation of the deployed position of the conveyor framework from the stanchion sensor 300a, and confirmation of a laid down status of the outer frame section on the ground based on a detected raising of the support wheels 100 by the wheel height sensor 300c and detected release of the locked alignment between the frame sections by the framework articulation sensor 300b.

At any time during the forgoing setup sequence, if an unlevel status of the deck 72' is detected by the tilt sensor(s) 300j, the next actuator enablement step in the prescribed sequence may be prevented until the deck 72' is re-leveled. Once all the forgoing steps have been completed, the controller enables user activation of the electric motors 308a, 308b, 308c of the belt conveyors and bucket elevator to allow use of the system. At any point during operation of these electric motors, if an unlevel state of the deck 72 is detected by the tilt sensors, the controller automatically interrupts power to the electric motors in order to terminate operation thereof as a safety precaution. It will be appreciated that other types of drive motors, for example hydraulic motors, may alternatively be employed to drive the belt conveyors and bucket elevator 50', and that the controller can similarly deactivate such hydraulic motors by ceasing the pumped delivery of hydraulic fluid thereto.

The tear-down collapse routine prescribed by the controller is generally the reverse of the forgoing setup procedure. Raising and aligned locking of the conveyor framework sections may be subject to detected fold-up of the drive-over ramps by suitable sensors for same, at which point activation of the conveyor framework support wheel motors 112 is subject to detected raising and aligned locking of the conveyor framework sections, and lock down of the outer frame section of the conveyor framework on the support stands 208 is subject to detected arrival of the support wheels 100 on the platform in a position aligning the outer frame section 92 over the support stands 208 and detected raising of the support wheels 100 and unlocking of the aligned status between the frame to lay the outer frame section atop said support stands 208. With the lock-down of the conveyor frame completed, unlocking of the bucket elevator frame from its upright operational position and subsequent collapse of the elevator raising/lowering actuators 116 are subject to confirmed collapse and locking of the discharge member 242 into its generally parallel alignment alongside the bucket elevator framework.

It will be appreciated the same concept of a control system configured to prescribe a particular setup and/or tear-down procedure by preventing operation of relocation mechanisms that reposition respective components until a particular positional status of one or more other components is detected may be employed in a prescribed sequence of different order, for example dictating deployment of the belt conveyors prior to erection of the bucket elevator and subsequent lowering of the bucket elevator prior to stowage of the belt conveyors. In one embodiment, the controller may use measurement signals from the tilt sensors to automatically adjust the positions of the support legs by controlling the hydraulic actuators thereof in order to start the setup procedure with a self-levelling step, and/or attempt to automatically correct minor detected variations of the deck from a level state during operation of the conveyor system.

The programming of a PLC unit or other controller to switch an actuator between an active/enabled state and an inactive/disabled state based on the receipt, or lack thereof, of a particular signal from each of one or more sensors disposed throughout the system is well within the ambit of a person of ordinary skill in the art, and thus not described herein in further detail. Likewise, the manner of setting up commercially available control equipment to achieve the described control system and resulting functionality will be apparent to one of skill in the art from the forgoing description. As demonstrated by the described use of electric motors for the feed conveyor and bucket elevator and hydraulic actuators to control the movement of various components between different positions during setup and collapse of the mobile conveyor system, it will be appreciated that the switching of different actuators between their active/enabled and inactive/disabled states may rely one or both of direct control between the controller and an actuator (e.g. switching an on/off function of an electric motor), or indirect control via an intermediate connected between the controller and an actuator (e.g. electronically changing the state of one or more electro-mechanical valves in a hydraulic control system to allow and prevent flow of hydraulic fluid to a hydraulic motor or linear actuator). Embodiments employing electric motors for the belt conveyors and bucket elevator make use of both electric-over-hydraulic and electric-only control aspects, while other embodiments may forgo electric-only control of the feed conveyor and bucket elevator by using hydraulic drive motors for same.

Finally, with reference to FIG. 23, the third embodiment mobile conveyor system features a unique tensioning mechanism 400 for tensioning the belt 402 of the receiving conveyor at the outer frame section 92 of the conveyor framework. A unique belt tensioning solution was required due to lack of space for conventional belt tensioning means due to the crowding of the outer end of the conveyor framework by to the drive-over ramps 30a, 30b and the raisable/lowerable drive system 98 that supports and drives the conveyor framework during deployment and stowage thereof.

The longitudinal beams 94 of the outer frame section are joined together by a cross-member 404 that spans perpendicularly between them. This is the same cross-member at which the uprights 110 for the hydraulic actuators 108 that control the raising and lowering the support wheels 100 of the conveyor framework's drive system 98. However, the drive system and associated uprights and linkages are omitted in FIG. 23 to enable clear illustration of the belt tensioning mechanism 400.

In a conventional manner, the belt 402 of the receiving conveyor is entrained about a plurality of horizontal rollers that lie perpendicularly between the two longitudinal beams 94. An end roller 406 residing nearest to the cross-member 404 of the conveyor framework has the belt 402 wrapped therearound to define a respective end of the endless belt's closed loop path around the rollers. The end roller 406 is rotatably supported at each end thereof by a respective roller support bracket 408 that is slidably supported on a respective one of the longitudinal beams 94 of the conveyor framework, whereby each such beam 94 defines a frame rail along which the respective roller support bracket 408 is displaceable back and forth in the longitudinal direction of the beam 94. A longitudinal slot 410 through the upright web of each beam/rail 94 accommodates the span of the end roller 406 between the two roller support brackets. Through the longitudinal sliding of the roller support brackets 408 on the beams/rails 94, the end roller 406 is displaceable along the beams/rails between the opposing ends of each slot 410, which stops short of reaching the cross-member 404 at the outer ends of the beams/tracks 94.

A linear hydraulic actuator 412 of the belt tensioner 400 has one end thereof mounted in a fixed position to a respective one of the beams/rails 94 on an inner side thereof that faces toward the other beam/rail 94. The actuator 412 lies parallel to the end roller 406 and the cross-member 404 at an elevation overlying the end of the slot 410 nearest to the cross-member 404. The other end of this belt tensioner actuator 412 has a pulley 414 rotatably mounted thereon for rotation about an upright axis perpendicular to the planar rectangular area that is bound on three sides by the cross-member 404 and the beams/rails 94. This upright rotational axis of the pulley lies in a vertical orientation when the beams/rails 94 of the outer frame section of the conveyor framework are seated on a flat horizontal surface. The pulley 414 is displaceable back and forth in a cross-wise or transverse direction relative to the longitudinal direction of the conveyor belt 402 by extension and collapse of the belt tensioner actuator 412.

A static pulley 416 of fixed position relative to the conveyor framework is rotatably mounted on the cross-member 404 on an inner side thereof that faces toward the end of the conveyor belt 402 entrained about the end roller 406. The static pulley 416 lies in the same plane as the displaceable pulley 414 and has a rotational axis parallel to that of the displaceable pulley 414. The static pulley 416 resides in an available space between the cross-member 404 and the belt tensioner actuator 412. The static and displaceable pulleys and the belt tensioner actuator 412 therefore all reside in a relatively small space bound between the two parallel beams/rails 94 and between the cross-member 404 and the nearest end of the conveyor belt 402 wrapped around the end roller 406.

On the opposing outer side of the cross-member 404 that faces away from the belt 402, a horizontal shaft 418 is rotatably supported by a set of pillow block bearings 420 mounted to the cross-member. When the drive system 98 is installed, this shaft 418 lies between the two uprights 110 and two sets of links that movably carry the walking beam 102 of the support wheels 100 of the conveyor framework's drive system 98. The rotatable shaft 418 features two outer pulleys 422 fixed thereon at the opposing ends of the shaft, and a third center pulley 424 fixed to the shaft at an intermediate position between the two outer pulleys. Each of these shaft-mounted pulleys 422, 424 lies in a respective vertical plane for rotation with the horizontal shaft 418 about the central horizontal axis thereof. The center shaft-mounted pulley 424 is positioned so that a tangent at the top of the center pulley lies coincident with a tangent of the static frame-mounted pulley 416 at a circumferential area thereof that faces toward the beam/rail 94 on which the belt tensioner actuator 412 is mounted.

A tensioning cable 426 has one end fixed to the same beam/rail 94 as the belt tensioner actuator 412 on the side thereof opposite the static pulley 416. The other end of the tensioning cable 426 is attached to the center pulley 424 on the shaft 418. Between its two ends, the tensioning cable 426 follows a serpentine path that extends around the far end of the displaceable pulley 414 that faces away from the actuator 412, and then back around the proximal side of the static pulley that faces toward the beam/rail 94 on which the actuator 412 is mounted. From this proximal side of the static pulley, the cable 426 is then entrained over the topside of the center shaft-mounted pulley 424 on the shared tangential line between the static and center pulleys. Each of the two outer shaft-mounted pulleys 422 resides in the same vertical plane as one of the roller support brackets 408. One end of a respective connection cable 428 is attached to each outer shaft-mounted pulley 422. This connection cable extends tangentially from the respective outer pulley 422 at the bottom thereof, i.e. from a point diametrically opposite the point where the tensioning cable 426 wraps onto the center pulley 424. The connection cable 428 of each outer pulley 422 passes through a respective opening 430 in the cross-member 404, and has its second end attached to a respective one of the roller support brackets 408. Each connection cable thus connects to the respective roller support bracket 408 from a direction opposite that in which the belt 402 extends from the displaceable end roller 406 of the conveyor belt toward the opposing end of the belt 402.

When the belt tensioner actuator 412 is extended, it forces the displaceable pulley 414 away from the beam/rail 94 to which the actuator is mounted, thereby increasing the length of the tensioning cable's serpentine path around the displaceable and static pulleys 414, 416. This pulls some of the tension cable from off the center shaft-mounted pulley 424, which causes the pulley 424 and attached shaft 418 to rotate in this unwinding direction of the tensioning cable 426. With the connection cables 428 wrapped on the end pulleys 424 in a direction opposite to that of the tensioning cable, this rotation of the shaft 418 in the unwinding direction of the tensioning cable 426 acts to wind the connection cables 428 further onto their respective end pulleys 422, thereby pulling the two roller-supporting brackets 408 toward the cross-member 404. This pulls the end-roller 406 of the conveyor belt toward the cross-member 404 at the outer end of the conveyor framework, and away from a statically mounted end roller of the conveyor belt at the opposing end of the outer section 92 of the conveyor framework 70. This pulling of the displaceable end roller 406 of the conveyor belt 402 away from a static end roller at the opposing end of the belt's closed-loop path thus increases the tension of the belt around its rollers. Accordingly, an operator can set the tension of the belt by operating the belt-tensioning actuator 412.

The use of a single cross-wise linear actuator with a serpentined tensioning cable allows hydraulic control of the belt tensioning operation without the need to accommodate longitudinal mounting of hydraulic cylinders on the beams 94 of the conveyor framework, for which space is not available in the illustrated embodiments due to the occupation of the space between the beams by the conveyor belt, the presence of the folding drive-over ramps 30*a*, 30*b* on the outside of the beams, and the mounting of the raisable/lowerable drive system 98 at the outer end of the conveyor framework 70. The added use of a rotatable shaft with end pulleys and connection cables that are driven by connection of the actuator-controlled tensioning cable 426 to a center pulley 424 on the shaft avoids a widening of the overall conveyor structure that would otherwise be needed if one were to instead position the shaft-mounted tension cable pulley 424 in alignment with one of the roller-supporting brackets 408 to use the same tensioning cable 426 to pull on that bracket directly, and thereby eliminate the need for one of the outer pulleys and its separate connection cable.

However, other embodiments employing only select features of the illustrated belt tensioner embodiment may also prove advantageous. For example, another embodiment exploiting a cross-wise actuator direction that may be beneficial in situations where longitudinally mounted actuators are cannot be easily accommodated may use a respective actuator and sepertined tension cable arrangement for each of the two roller-support brackets, in which case the second end of the serpentine tension cable may be coupled directly to the respective roller support bracket without requiring a separate connection cable. Since various modifications can be made in my invention as herein above described, and many apparently widely different embodiments of same made within scope of the claims without department from such scope, it is intended that all matter contained in the accompanying specification shall be interpreted as illustrative only and not in a limiting sense.

The invention claimed is:

1. A portable conveyor system for receiving particulate material from a transport vehicle and conveying said particulate material to an elevated location, the portable conveyor system comprising:
    a transportable frame comprising ground wheels for rolling support of the transportable frame on a ground surface during transport of said transportable frame;
    a main conveyor carried on the transportable frame and movable into and out of an operational position in which an outlet of the main conveyor is at a greater elevation relative to an inlet of the main conveyor than in a storage position in which the main conveyor is less upright than in said operational position;
    a feeder conveyor operable to convey material from an input region of the feeder conveyor to an output end of the feeder conveyor for feeding said material into the inlet of the main conveyor; and
    a conveyor framework movably connected to the transportable frame for movement of said feeder conveyor between a stowed position and a use position extending laterally outward from the transportable frame; and
    a drive-over assembly carried on the conveyor framework and comprising a bridging portion spanning transversely across the feeder conveyor at the inlet region thereof; and
    a flow-through area in the bridging portion having at least one opening therein to allow passage of particulate material through the flow-through area of the bridging platform to the inlet region of the feeder conveyor.

2. The portable conveyor system of claim 1 wherein the conveyor framework is arranged to reside between opposing sides of the transportable frame in the stowed position.

3. The portable conveyor system of claim 1 wherein the feeder conveyor comprises a first conveyor section spanning out from under the bridging portion of the drive-over assembly and a second longitudinal conveyor section fed by first longitudinal conveyor section and leading therefrom toward the inlet of the bucket elevator, and the first and second feeder conveyor sections are respectively carried on first and second sections of the conveyor framework that are pivotally joined by a pivotal connection that allows relative pivoting between said first and second sections of the conveyor framework about an axis lying transverse to said feeder conveyor.

4. The portable conveyor system of claim 1 comprising at least one support wheel mounted to a wheeled portion of the conveyor framework for rolling support of the conveyor framework into and out of the use position.

5. The portable conveyor system of claim 4 further comprising a conveyor ramp moveable into an access position extending from the transportable frame down to the ground surface at the same side of the transport frame from which the conveyor framework extends in the use position to enable rolling movement of the wheeled portion of the conveyor framework off of and back onto the transportable frame via said conveyor ramp during movement of the conveyor framework into and out of the use position.

6. The portable conveyor system of claim 1 wherein the conveyor framework is pivotally connected to the transportable frame for swinging movement of the conveyor framework about an upright pivot axis into and out of the use position, and at least one drive wheel is mounted to the conveyor framework at a distance from the upright pivot axis to drive movement of the conveyor framework into and out of the use position.

7. The portable conveyor system of claim 1 comprising at least one feeder conveyor stand that reaches upward from the transportable frame, wherein the conveyor framework is arranged to reside atop said feeder conveyor stand in the stowed position, and at least one feeder conveyor lock down mechanism on the at least one conveyor stand frame that is arranged to lock the feeder conveyor to the at least one conveyor stand in the stowed position.

8. The portable conveyor system of claim 7 wherein the feeder conveyor frame comprises two longitudinal beams each having a respective flange projecting laterally therefrom, and the feed conveyor lock down mechanism comprises two hooked members that lie in a cross-wise direction to the two longitudinal beams in the stowed position of the feeder conveyor with hooked outer ends of the hooked members opening toward one another in the cross-wise direction, and a lock actuator that is operable in a locking direction to draw the hooked outer ends of the two hooked members toward one another in the cross-wise direction to hook over the flanges of the two longitudinal beams, and is operable in an opposing release direction to force the hooked outer ends of the two hooked members apart in the cross-wise direction to withdraw said hooked outer ends from the flanges of the two longitudinal beams.

9. The portable conveyor system of claim 1 comprising a control system featuring at least one tilt sensor installed on the transportable frame and operable to detect level and unlevel conditions thereof, and at least one main conveyor actuator connected between the main conveyor and the transportable frame and operable to raise the main conveyor into the operational position, wherein the control system is configured to prevent raising of the main conveyor by the at least one conveyor raising actuator in the absence of a detected level condition of the transportable frame by the at least one tilt sensor.

10. The portable conveyor system of claim 9 wherein the control system is configured to automatically level the transportable frame by controlling actuation of support legs that extend downward to the ground from the transportable frame.

11. The portable conveyor system of claim 1 comprising a control system featuring at least one tilt sensor installed on the transportable frame and operable to detect level and unlevel conditions thereof, and comprising at least one feeder conveyor actuator operable to move the feeder conveyor from the stowed position to the use position, wherein the control system is configured to prevent deployment of the feeder conveyor by the at least one feeder conveyor actuator in the absence of a detected level condition of the transportable frame by the at least one tilt sensor.

12. The portable conveyor system of claim 1 comprising:
for the main and feeder conveyors, respective conveyor repositioning mechanisms by which the main conveyor is movable between the storage and operational positions and the feeder conveyor is movable between the stowed and use positions; and
a control system comprising sensors operable to detect a positional status of each of the main and feeder conveyors, configured to prevent movement of one of the main and feed conveyors by the respective conveyor repositioning mechanism in the absence of a particular detected positional status of the other one of the main and feed conveyors.

13. The portable conveyor system of claim 12 wherein the control system is configured to prevent deployment of the feeder conveyor from the stowed position to the use position prior to deployment of the main conveyor from the storage position to the operational position.

14. The portable conveyor system of claim 12 wherein the control system is configured to prevent return of the main conveyor from the raised position to the storage position prior to return of the feeder conveyor to the stowed position from the use position.

15. The portable conveyor system of claim 1 comprising a movable discharge member connected or connectable to the outlet end of the main conveyor and at least one discharge member actuator connected to the movable discharge member and operable to adjust a position of a discharge end of the discharge member relative to the outlet end of the main conveyor.

16. The portable conveyor system of claim 1 wherein the feeder conveyor is a belt conveyor comprising:
a conveyor frame comprising a pair of conveyor frame rails;
a belt positioned between said conveyor frame rails and entrained about a set of rollers that lie cross-wise to the pair of conveyor frame rails and include a displaceable end roller at one end of the belt, the displaceable end roller having opposing ends thereof supported by roller support brackets that are slidably disposed on the pair of conveyor frame rails for movement of the end roller back and forth along said pair of conveyor frame rails; and
a belt tensioning mechanism comprising:
a displaceable pulley connected to the conveyor frame by a linear actuator that is mounted to one of the conveyor frame rails in a space defined between the pair of conveyor frame rails and between the end of the belt entrained about the displaceable end roller and a cross-member of the conveyor frame that connects the conveyor frame rails together at a location beyond said end of the belt;
a tensioning cable having a first end that is attached to the conveyor frame and a second end that is connected to at least one of the roller support brackets from a direction opposing that in which the belt reaches from the displaceable end roller toward an opposing end of the belt;
whereby actuation of the linear actuator in one direction tensions the belt by pulling the roller support brackets and the end roller carried thereby away from the opposing end of the belt.

17. The portable conveyor system of claim 1 wherein the main conveyor comprises a bucket elevator that is carried on the transportable frame, stands upright in relation to the transportable frame in the operational position, and is laid down to lie more along the transportable frame than upright therefrom in the storage position.

18. A portable conveyor system for receiving particulate material from a transport vehicle and conveying said particulate material to an elevated location, the portable conveyor system comprising:
a transportable frame comprising ground wheels for rolling support of the transportable frame on a ground surface during transport of said transportable frame;
a main conveyor comprising a bucket elevator carried on the transportable frame and movable between an operational position standing upright in relation to the transportable frame and a storage position laid down from the upright position to lie more along the transportable frame than upright therefrom;
a feeder conveyor connected to the transportable frame and operable to convey material from an input region of the feeder conveyor to an output end of the feeder conveyor for feeding said material into an inlet of the bucket elevator that is situated adjacent a lower end of the bucket elevator in the operational position;
a drive-over assembly comprising a bridging portion spanning transversely across the feeder conveyor at the inlet region thereof; and
a flow-through area in the bridging portion having at least one opening therein to allow passage of particulate material through the flow through flow-through area of the bridging platform to the inlet region of the feeder conveyor;
wherein the transportable frame has opposing first and second ends spaced apart in a longitudinal direction thereof and the feeder conveyor and the main conveyor are connected to the transportable frame at positions offset from one another in a lateral direction lying cross-wise to the longitudinal direction.

19. The portable conveyor system of claim 18 wherein the main conveyor resides entirely to one side of the feeder conveyor in said lateral direction.

20. A portable conveyor system for receiving particulate material from a transport vehicle and conveying said particulate material to an elevated location, the portable conveyor system comprising:
a transportable frame comprising ground wheels for rolling support of the transportable frame on a ground surface during transport of said transportable frame;
a main conveyor carried on the transportable frame and a feeder conveyor carried on a conveyor framework that is movably connected to the transportable frame, the feeder conveyor being operable to convey material from an input region of the feeder conveyor to an output end of the feeder conveyor for feeding of said material into the inlet of the main conveyor, the main conveyor and the feeder conveyor each being movable between a respective storage position and a respective operational position, the respective operational position of the main conveyor placing an outlet of the main conveyor at a greater elevation relative to an inlet of the main conveyor than in the respective storage position of the main conveyor in which the main conveyor is less upright than in said respective operational position of the main conveyor, and the operational position of the feeder conveyor placing the feeder conveyor in an orientation extending laterally outward from the transportable frame;

a respective conveyor repositioning mechanism for each of the main conveyor and the feeder conveyor, by which the main conveyor and the feeder conveyor are each movable between the respective storage and operational positions; and a control system comprising conveyor position sensors operable to detect a positional status of each of the main and feeder conveyors, the control system being configured to prevent movement one of the main and feed conveyors between the respective storage and operational positions thereof in the absence of a particular detected positional status of the other one of the main and feed conveyors.

* * * * *